(12) United States Patent
Hoffschmidt

(10) Patent No.: US 6,383,422 B1
(45) Date of Patent: May 7, 2002

(54) POROUS MEMBER WITH PENETRATING CHANNELS FOR FLUID FLOW THERETHROUGH AND A METHOD OF PRODUCING THE MEMBER

(75) Inventor: Bernhard Hoffschmidt, Bergisch-Gladbach (DE)

(73) Assignee: Deutsches Zentrum fuer Luft-und Raumfahrt e.V, Bonn (DE)

( * ) Notice: Subject to any disclaimer, the term of this patent is extended or adjusted under 35 U.S.C. 154(b) by 0 days.

(21) Appl. No.: 09/486,089
(22) PCT Filed: Aug. 7, 1998
(86) PCT No.: PCT/EP98/05024
§ 371 Date: Feb. 22, 2000
§ 102(e) Date: Feb. 22, 2000
(87) PCT Pub. No.: WO99/10295
PCT Pub. Date: Mar. 4, 1999

(30) Foreign Application Priority Data

Aug. 22, 1997 (DE) .......................... 197 36 638
Aug. 30, 1997 (DE) .......................... 197 38 021
Nov. 15, 1997 (DE) .......................... 197 50 733

(51) Int. Cl.[7] .............................................. B29C 65/00
(52) U.S. Cl. ................. 264/44; 264/DIG. 48; 366/340; 210/510.1; 55/523
(58) Field of Search .................... 264/44, 45.1, 51, 264/DIG. 48; 210/500.25, 500.26, 510.1; 55/523, 524, 529; 366/336, 340

(56) References Cited

U.S. PATENT DOCUMENTS

| 4,056,586 A | * | 11/1977 | Pryor et al. |
| 4,251,239 A | * | 2/1981 | Clyde et al. |
| 5,066,432 A | * | 11/1991 | Gabathuler |
| 5,510,063 A | * | 4/1996 | Gadkaree et al. |
| 5,770,326 A | * | 6/1998 | Limaye |
| 5,997,744 A | * | 12/1999 | Limaye |

FOREIGN PATENT DOCUMENTS

DE 24 60 910 A * 7/1976

* cited by examiner

Primary Examiner—Charles E. Cooley
Assistant Examiner—David Sorkin
(74) Attorney, Agent, or Firm—Diller, Ramik & Wight

(57) ABSTRACT

According to the present invention, a porous member made of temperature-resistant material for filtering and/or mixing fluids comprises first channels (132) and second channels (138) respectively extending therethrough. The channels extend under an acute angle to the flow direction (D). Fluids flowing through the porous member (101) flow through the channels (132, 138), on the one hand, and, on the other hand, through the porous material between the channels so that a good mixing of the fluids is obtained and a fluid, homogenized over the cross section, exits from an outlet surface (103). The invention further refers to methods of making the porous member (101), wherein, according to the present invention, a foamed plastic material member is formed with channels, the foamed material member is wetted with wetting material and is afterwards removed by evaporation during the curing.

33 Claims, 15 Drawing Sheets

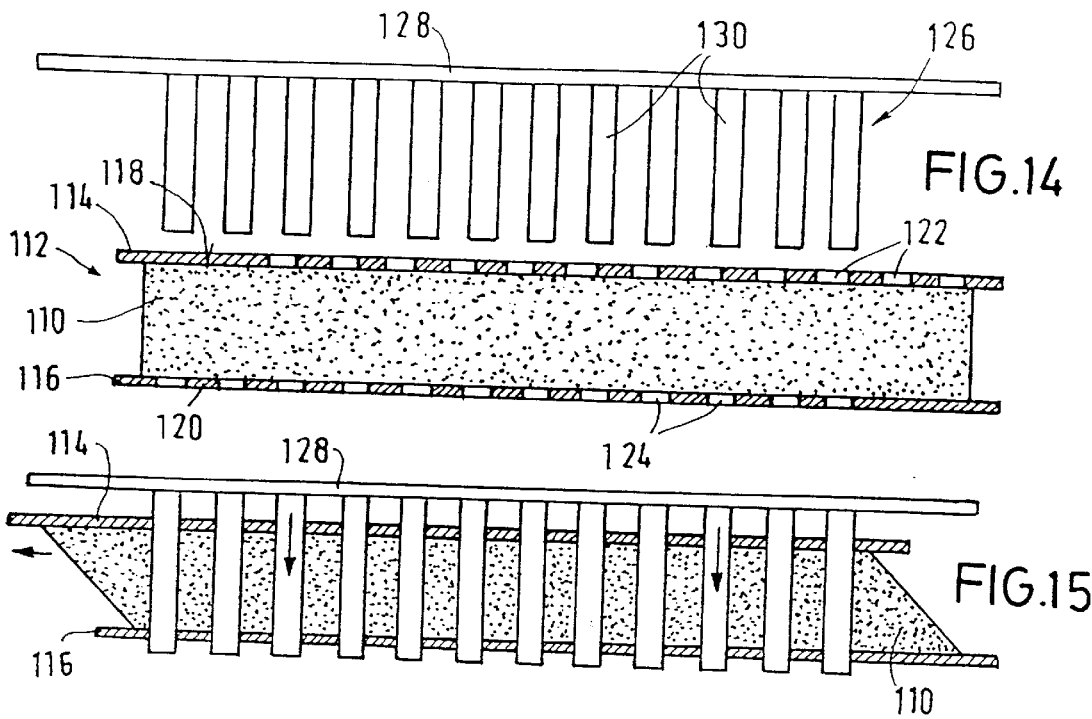
FIG.14
FIG.15
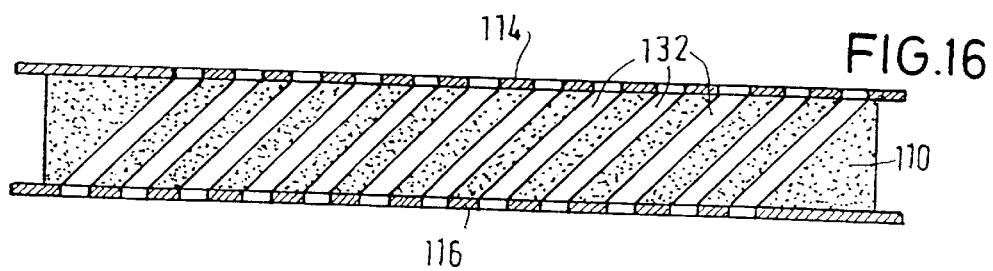
FIG.16
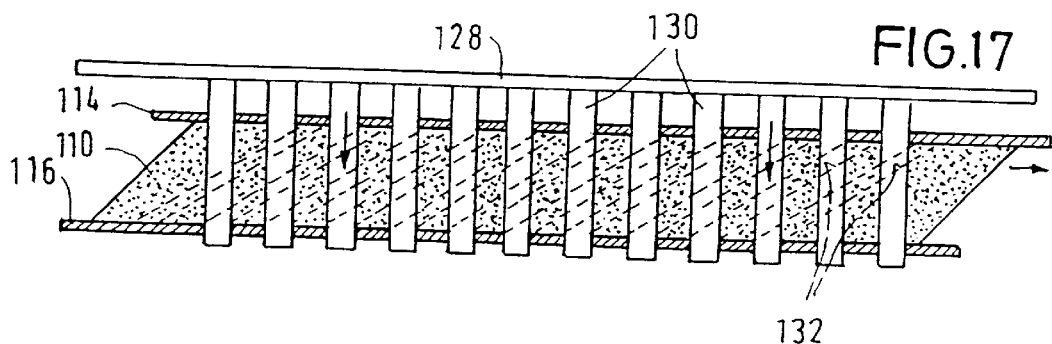
FIG.17
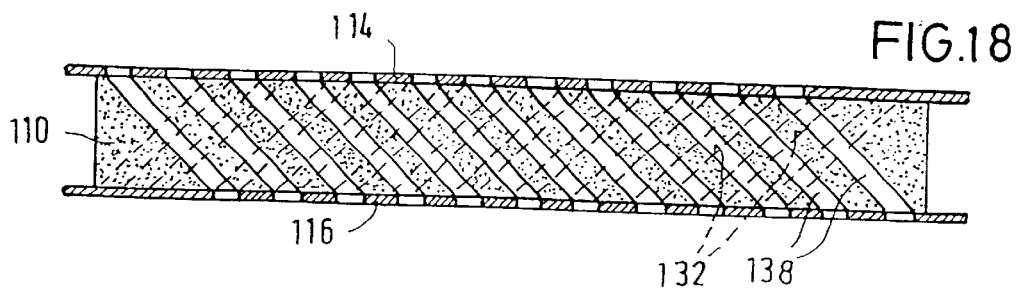
FIG.18

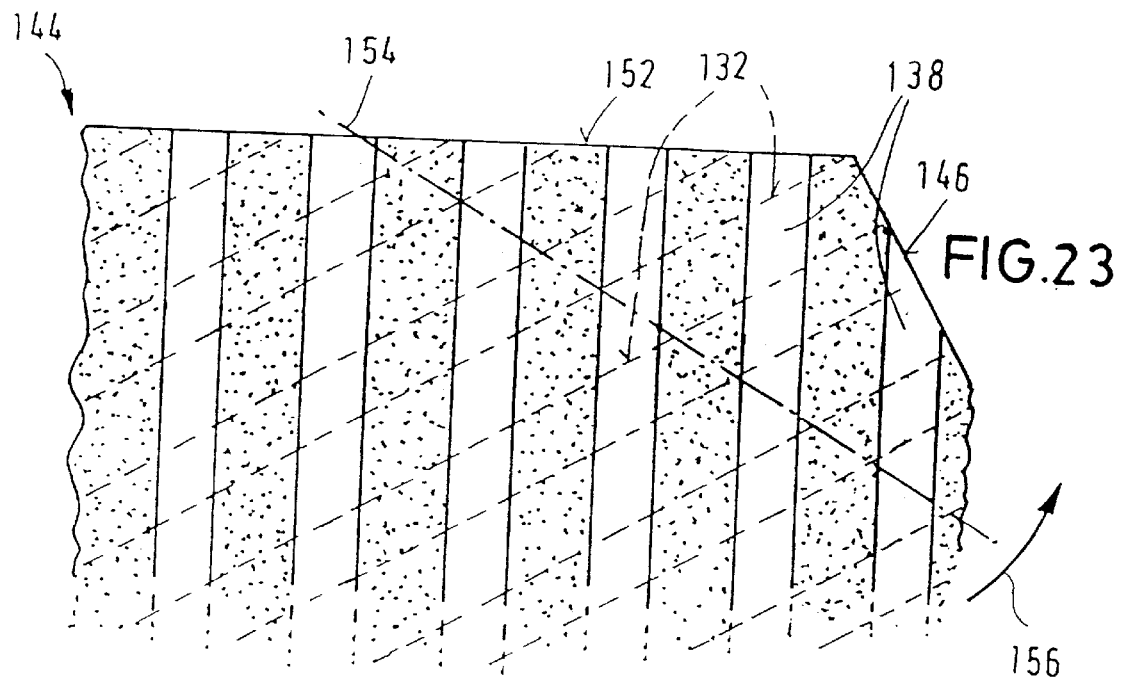
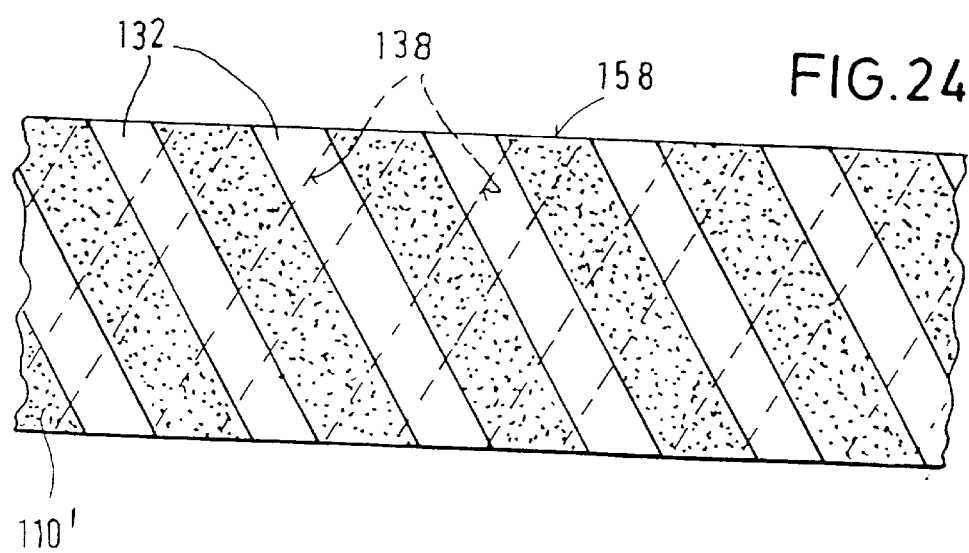

POROUS MEMBER WITH PENETRATING CHANNELS FOR FLUID FLOW THERETHROUGH AND A METHOD OF PRODUCING THE MEMBER

BACKGROUND OF THE INVENTION

A porous member with penetrating channels for fluid flow therethrough and a method for producing the member The invention refers to a porous member of temperature-resistant material having channels extending therethrough through which a fluid (gas and/or liquid) may pass, and to a method for producing this member.

Such members are used, for example, as chemical mixers. The conventional chemical mixers consist of corrugated sheets of steel or ceramic fabrics. These abutting steel sheets or ceramic fabrics are comprised into units with crossing channels forming between the steel sheets or the fabrics. Sometimes the steel sheets are perforated so that a fluid flow passing through this chemical mixer member is homogenized, thereby mixing the fluid. For reasons of production, the individual mixer members cannot be produced with more than a certain maximum length. Thus, for producing longer mixers, a plurality of such mixer members are arranged in line. This increases the cost of the production process.

SUMMARY OF THE INVENTION

It is the object of the invention to provide a porous member with penetrating channels through which fluid may flow, wherein the homogenization and mixing of the fluid is improved, and to provide simplified methods of producing such a member, substantially independent of the length of the porous member.

The present porous member of temperature-resistant material has an inlet surface and an outlet surface The fluid flowing through the porous member enters the porous member at the inlet surface and leaves the porous member at the outlet surface so that flow direction runs from the inlet surface towards the outlet surface. According to the invention, the porous member is provided with first channels extending under an acute angle to the flow direction. In the following, an acute angle is an angle other than 0°. Due to the porosity of the member, the channels penetrating the member are in communication so that a mixing of the fluid flowing through the porous member occurs. Since the channels form an acute angle with the flow direction, a part of the fluid flows through the channels and a part of the fluid flows in the flow direction through the porous portions, i.e., the porous walls between the channels immediately in the flow direction. Thus, the fluid (or several fluids) is mixed and homogenized so that a homogenized fluid exits from the outlet surface of the porous member.

Since the porous member is temperature-resistant, it is suited for mixing hot fluids. In doing so, due to the present structure of the member, no local overheating occurs that could damage or destroy the porous member.

Moreover, the present porous member is suited for filtering fluids.

Here, particles are deposited on the walls of the pores. Due to the temperature resistance of the member, which is made, for example, from high temperature-resistant ceramics such as zirconia oxide or silicon carbide, the member used for filtering may be cleaned by burning, whereby the residual filtered matter is combusted. This does not damage the filter. In particular, the present porous member is simultaneously suited for mixing and filtering fluids.

Depending on the shape of the porous member and the position of the inlet and outlet surfaces, the flow direction varies. For example, in a cylindrical member whose end faces are the inlet and outlet surfaces, respectively, the flow direction is straight. In a bent or otherwise shaped porous member, the center line of the member corresponds to the flow direction so that the flow direction varies in the longitudinal direction of the member.

Preferably, besides the first channels, the porous member has second channels that are also arranged under an acute angle to the flow direction and, in addition, are arranged under an angle to the first channels, i.e. an angle other than 0°. Such crossing channels that may penetrate each other at least partly, improve the homogenization and mixing of the Fluids. A further improvement may be achieved by varying the angle of the channels to the flow direction along the extension of the channels. In a cylindrical porous member with a continuous flow direction over the length of the member from the inlet to the outlet surface, the channels are wavy or zigzag-shaped, for example. Thus, a portion of the fluid flowing through the member that is sufficient to homogenize the fluid, flows through the porous portions.

The channels of the porous member are preferably arranged in rows, at least one row of first channels and a row of second channels being provided, and the channel rows being arranged alternating side-by-side and in parallel.

In a preferred embodiment, the porous member is cylindrical and the first and/or second channels extend from the inlet surface to the outlet surface of the member. Here, cylindrical means a longitudinal member with parallel end faces having the same, but an optional contour. Depending on the conditions of the device in which the porous member is used, the contour may be a curve or a polygon, for example.

Besides the usefulness of the porous member as a chemical mixer for mixing fluids and as a filter for filtering particles from fluids, the present porous member can also be used, in particular, in the combustion chamber of a pore burner.

Pore burners have a housing with an inlet and an outlet, a mixture of gas and air flowing into the pore burner through the inlet and the flue gases being exhausted from the pore burner through the outlet. Prior to ignition, the gas-air mixture flows in the flow direction of the pore burner and through a backfire means. As the backfire means, a conventional flame retention baffle or a plate with holes may be provided, for example. The backfire means prevents the gas-air mixture burning behind the backfire means, seen in the flow direction, from backfiring towards the inlet opening. The backfire means is followed by the combustion chamber in which the gas-air mixture is ignited by an ignition means and burned therein. Pore burners are characterized in that the combustion chamber accommodates a heat-resistant porous material in which the gas-air mixture is combusted. Thus, a more uniform combustion of the gas-air mixture is obtained so that within a large effective range of the pore burner, only small amounts of pollutants such as $NO_x$ or CO are produced during combustion. Using the present porous member in the combustion chamber of the pore burner, the emission of pollutants is reduced further. Thus, even at one thirtieth of the nominal power of the pore burner, a clean combustion is obtained. The pore burner is particularly suited for use in heating installations.

A further use of the porous member, according to the invention, is its implementation as a heat accumulator. Due to the porous structure of the member and the channels extending therethrough, the fluid flowing through the porous member is distributed homogeneously over the cross section of the member so that, when hot fluid flows through the member, the heat is received homogeneously by the porous member. When cooler fluid passes through subsequently, the heat uniformly transferred from the porous member to the fluid so that a uniform heating of the fluid occurs. Therefore, the present porous member is very well suited for use as a short- and medium-term heat accumulator.

In particular, the porous member is suited for use as a heat accumulator in regenerative radiant burners. Regenerative radiant burners serve to heat material, for example, steel ingots, by thermal radiation. Here, two radiant burners operating at intervals are employed. Each burner is provided with a porous member as the heat accumulator. Further, a blower or suction device is provided which, at intervals, either supplies the burners with a mixture of fuel and air or fresh air or exhausts the flue gases. During the first cycle, the blower directs fresh air or a mixture of gas and air through the heat exchanger of the first burner to the combustion head, where the fresh air is either mixed with fuel and ignited or the mixture of fuel and air is ignited directly. In the first cycle, the burner flame of the first burner heats the material located above the burner by radiant heat. In the meantime, the flue gases are exhausted through the heat exchanger of the second burner, heating the same up. To this end, the same blower or a separate suction device can be used. In the second cycle, the function of the two burners is interchanged so that fresh air or a gas-air mixture is passed through the heat exchanger of the second burner and heated up in the process. The heated gas-air mixture is ignited in the combustion head of the second burner. In the second cycle, the material is heated by the radiant heat of the flame of the second burner and the flue gases are exhausted through the heat exchanger of the first burner. By providing the heat accumulators in each of the two burners, the gas-air mixture or the fresh air is pre-heated so that the efficiency of the radiant burners is increased significantly. The use of the porous members of temperature-resistant material, preferably ceramics, as provided by the invention, prevents local damages to the heat exchanger even at very high temperatures. Using the porous member as a heat accumulator, it is possible to pre-heat the fresh air to about 1000° C. Moreover, the porous members serve as exhaust gas filters.

For manufacturing the porous member of temperature-resistant material, in particular ceramics, with channels extending through the member, the invention proposes a method, wherein, according to a first variant at least one insert member is placed in a mold, the insert member defining the course and the shape of at least one channel, a foamed plastic material is introduced into the mold so that the at least one insert member is embedded in the foamed plastic material member which is flexible after curing, the foamed plastic material member is removed from the mold and the at least one insert member is removed from the foamed plastic material member, the surface of the foamed plastic material member is wetted with a curable temperature-resistant wetting material, and the foamed plastic material of the foamed plastic material member wetted with wetting material is removed by heating the same so that a porous member made from the wetting material and adapted to be flown through by a fluid is obtained.

It is the principle idea of the present method to first provide a flexible foamed material structure with channels running therethrough. According to the invention, this is done by providing foamed plastic material around an insert member representing the course of the later channel and by embedding the same therein. Alternatively, a plurality of such insert members may be used. The insert members may have a structure changing in all three dimensions so that eventually not only straight, but also curved, wavy or zigzag-shaped channels may be produced. The foamed plastic material is flexible after curing so that the insert members can be pulled from the foamed plastic material. Thereafter, a foamed plastic material member is left through which extend one or a plurality of straight or curved channels, the channels being in communication due to the porous structure of the foamed plastic material. The foamed plastic material suitably is an open-cell or a closed-cell material. In particular, polyurethane is used as the foamed plastic material.

After the insert member(s) has (have) been removed from the foamed plastic material member, the foamed plastic material member is wetted with a wetting material. This wetting can be imagined as a wetting of the entire surface of the structure of each foamed plastic material member with the wetting material. Preferably, the wetting material is slip, in particular ceramic slip. It is of general importance that the wetting material is cured so that after curing a self-supporting wetted foamed plastic material member is obtained, the dimensional stability and the self-supporting ability thereof being provided by the wetting material. Thus, the porous member thus formed includes, on the one hand, the channels with their inner walls wetted with the wetting material and, on the other hand, the connections between adjacent channels also wetted on their inner walls. Subsequently, this foamed material member wetted with hardened wetting material is heated to a degree that the foamed plastic material is removed by burning. An alternative method of removing the foamed plastic material is the evaporation resulting, for example, from a chemical reaction with a corresponding process gas.

In the manner described above, porous members with channels and with optional length may be made, even when the channels have undercuts or similar three-dimensionally varying paths. Such a member may be employed as a catalyst, if, for example, a catalytically active layer is applied. With or without this additional layer, it may anyway be used as a chemical mixer homogenizing a fluid mixture flow passing through, thereby mixing the fluids. It is a further advantage of such a mixer (a porous member with channels running therethrough) that it has only a low flow resistance. Of course, one would obtain a fluid flow rate with a porous member, causing, however, a much greater flow resistance than with a porous member produced according to the above method. Likewise, the present porous member may be used as a filter. Since the porous member is made of temperature-resistant material, the filter may be cleaned by burning.

According to a second variant of the invention, the porous member of temperature-resistant material, in particular ceramics, penetrated by channels and adapted to be flown through by fluid may be produced by producing a wavy flexible mat of foamed plastic material, winding the mat into a foamed plastic material member, wetting the surface of the foamed plastic material member with a curable temperature-resistant wetting material, and removing the foamed plastic material of the foamed plastic material member wetted with wetting material by heating the same, so that a porous member made from the temperature-resistant wetting material and adapted to be flown through by a fluid is obtained.

With this production variant, a wavy flexible mat of open-cell or closed cell foamed plastic material is produced which is then rolled into a (wound) member. The foamed plastic material member thus formed is penetrated by channels that are formed between the valleys and the peaks of adjacent windings of the wavy flexible mat. For example, the wound member retains its wound structure by using an adhesive.

The insert members may be rigid or, preferably, flexible and/or inflatable. After the foamed plastic material member has been produced, the insert members inflated until then may be deflated or relaxed so as to be removed from the foamed plastic material member. Should the insert members not be inflatable, but flexible, they may readily be pulled from the foamed material due to their flexibility.

After the forming of the wound member, another wetting with temperature-resistant wetting material is performed, the material being allowed to cure. Thereafter, the member thus made is heated to remove the foamed plastic material. The advantages to be obtained with the porous member of this variant are identical to those described for the first variant of the invention. In addition, the manufacturing process of the second manufacturing variant is simpler since no insert members are embedded in the foamed plastic material member that have to be withdrawn from the cured, but still flexible foamed plastic material.

It is true for both variants of the invention that the wetting material preferably is slip, in particular ceramic slip. The wetting step is performed by drenching the foamed plastic material member with the wetting material. These methods are known per se from the production of ceramic foams. The ceramic slip is cured by burning. At the same time, the foamed plastic material is removed by evaporation.

Further, it is true for both above described variants of the invention that the foamed plastic material member wetted with the wetting material is cured. Since the foamed plastic material member is still flexible while the wetting material is not yet cured, it may be placed in bent or otherwise shaped molds (molds for connector pipes, for example, or the like) to then cure in these molds. Thus, the finished product has a shape that allows a compact mounting in a mixer or filter assembly or a pipeline of a mixer or filter assembly. Finally, it is suitable to make the insert members and the mold from material inert to the foamed material or to provide it with a coating of inert material.

For producing a porous member of temperature-resistant material, in particular ceramics, adapted to be passed through by fluid and being provided with channels extending therethrough, the invention proposes the following method as a third variant, wherein at least one foamed plastic material member with a top and a bottom surface is formed from a flexible foamed plastic material, the foamed material member being sheared in a first direction about a shear angle by being subjected to a first shearing force, from the top and/or the bottom surface, first channels are formed in the foamed plastic material member thus sheared, the channels being formed under an angle to the normal of the top and/or bottom surface, this angle being different from the first shear angle, the first shearing force is relaxed and the foamed plastic material member restores itself, the surface of the foamed plastic material member is wetted with a curable temperature-resistant wetting material, and the plastic material of the foamed plastic material member wetted with the wetting material is removed.

The essential idea this method is based on is to first provide the flexible foamed plastic material structure with channels extending therethrough. For an improved mixing of the fluid passing through the member, these channels extend obliquely to the axial extension of the member. One could form these oblique channels under an angle other than 90° to the top or bottom surface of the foamed material structure or the foamed material member. This, however, makes the production process more difficult, which is due in particular to the flexible structure of the foamed material member. Therefore, in this third variant of making the present porous member, it is proposed to shear the foamed material member, i.e., to subject the foamed material member to shearing forces. Now, the channels may be formed under an angle of 90°, in particular, to the top or bottom surface of the sheared foamed material member. When the shearing force acting on the foamed material member is subsequently relaxed so that the foamed material member is in its relaxed state, the channels extending through the foamed material member are oblique.

In the manner described above, first channels extending in a first direction may be formed in a foamed plastic material member. Subsequently, the foamed material member, according to the first and second variant, is wetted with temperature-resistant wetting material and the foamed plastic material member is removed.

When the foamed plastic material member is sheared in another direction after the forming of the first channels, which direction is preferably opposite to the active direction of the previously applied shearing force, second channels may be formed in the foamed material member extending through the foamed material member in a direction different from that of the first channels. Thus, two groups of channels run through the foamed plastic material member, having different orientations.

Depending on the magnitude of the shearing forces and their effective directions, channels with different degrees of inclination may be formed in a formed plastic material member. The orientation of the channels also depends on the angle under which they are formed in the sheared foamed member.

The process steps of shearing the foamed plastic material member and of forming channels can also be performed simultaneously. To this end, for example, a punching tool may be set on the top or the bottom surface of the undeformed foamed member which is not yet subjected to shearing forces. As soon as the punching tool contacts one side of the foamed member, it is displaced relative to the opposite side of the foamed plastic material member so that shearing forces act on the foamed member. The punching is performed either upon reaching the desired shear angle or already during shearing. Thus, it is sufficient to displace the punching tool during punching, relative to the opposite side of the foamed member so that shearing forces act on the foamed member.

For the channels to be punched in the foamed member to have a possibly circular section, the foamed member may be pressed prior to or after the punching, whereby it is compressed.

In a fourth variant of the process, the channels are formed in a foamed member without shearing the same. In this variant, first channels are formed in an outer surface of a foamed member. Subsequently, the foamed member is cut, the cutting surface extending under an acute angle to the longitudinal extension of the first channels. A foamed member thus cut can be processed further, until a plate material is obtained having parallel top and bottom surfaces, one surface being defined by the cutting surface.

In the variant described above, second channels may be formed in the cutting surface after the cutting of the foamed plastic material member, whereupon the foamed plastic material member is cut again such that this cutting surface extends under an acute angle to all of the channels. When the foamed plastic material member thus cut is processed further so that a plate material or foamed material blocks are obtained, a foamed material structure is produced that is run through by channels extending oblique to each other and that has parallel top and bottom surfaces, at least one of which is defined by the (second) cutting surface. Thereafter, the foamed plastic material member is again wetted with wetting material, as described above, and the foamed plastic material member is removed.

In the most general form, this advantageous production method according to the third and fourth variants provides a foamed material structure through which oblique channels extend, wherein groups of these channels extend in parallel and the channels may be subdivided into a plurality of groups of channels with different relative orientations.

Suitably, a plurality of thus produced foamed material members are superimposed, wetted and cured, the foamed plastic material member being removed during curing, so that a member can be produced through which fluid may flow and which has properties of a mixer, all this without restrictions in length incurred by the manufacturing process. The individual foamed material members are preferably made as a plate material of random geometric shape with parallel top and bottom surfaces.

The channels are preferably formed by punching the foamed material member. Such a punching tool comprises two pressing members frictionally contacting the top and bottom surfaces of the foamed material member. When these two pressing members have been brought into frictional engagement with the foamed plastic material member, at least one pressing member is moved relative to the other so that the foamed plastic material member arranged therebetween is sheared. Now, the punching tool can be moved into the foamed plastic material member. Here, it is feasible to compress the sheared foamed plastic material member by moving the pressing members toward each other, such that the holes may be formed by means of punching tools.

It is further suitable to have perforated pressing members so that the punching tools may be advanced through the holes into the foamed plastic material member. In the state in which the foamed plastic material member is punched, the holes of the two pressing means should be flush.

Thus, the third and fourth variants of the present method provides for the production of a porous member through which a fluid can flow, the member comprising either a single foamed plastic material member or several superposed foamed plastic material members which or each of which has one channel or a plurality of channels extending under a common oblique angle or under different oblique angles. Due to the porous structure of the foamed plastic material member, these channels are interconnected. When using a plurality of foamed plastic material members, it is suitable to have different, in particular oppositely directed, orientations of the adjoining channels of adjacent foamed material members.

Suitably, the foamed plastic material is an open-cell or a closed-cell material. In particular, polyurethane is used as the foamed plastic material.

When a plurality of adjoining foamed plastic material members are provided with wetting material, it is suitable to interconnect the foamed plastic material members before wetting. Here, it is feasible to weld the foamed plastic material members together by heating their contact surfaces. An alternative to this connection is to couple adjacent foamed plastic material members by means of the cured wetting material.

Since the foamed plastic material member or the group of successive foamed plastic material members is still flexible with the wetting material not yet cured, it can be placed in curved or otherwise shaped molds (such as manifold molds or the like) to be cured in these molds by burning. Thus, the finished product is given a shape that allows for a compact installation in a mixer device or a tubing of such a mixer device.

The present invention allows to produce ceramic mixers that are characterized by an excellent mixing of the fluid flowing therethrough. When a porous member produced according to the invention is used, for example, to mix the combustion gases of an internal combustion engine, as, for example in a motor vehicle, a catalyst also used therein may be arranged closer to the outlet valves of the internal combustion engine than was possible up to now. The catalysts presently used, in particular, in vehicle production, are supposed to have a minimum distance from the outlet valves of the internal combustion engine, because a sufficiently well mixture of the combustion gases occurs only at a certain distance after the outlet valves so that their cleaning by the catalyst is satisfying. A mixer produced according to the present invention, however, makes it possible to reduce the distance between the catalyst and the outlet valves of the internal combustion engine. This is advantageous with a view to the cleaning of the combustion gases, since the combustion gases now flow into the catalyst at a higher temperature.

In the present method, it should be underlined as being particularly advantageous that for producing the foamed plastic material members, the conventional production methods for foams may be used. The foams, mostly coming as blocks, merely have to be processed to plate material which will then be sheared in accordance with the present invention so as to form the channels. The production of block foam is rather economic so that, after all, also the rigid members to be flown through by a fluid can be made at relatively low cost, making use, in particular, of the well-known technology of foam production. In particular, no special molds are required for the foam production. Thus, the production process of the present invention uses a semi-finished material, i.e. foamed plastic plate material which is available at extremely low cost. Also the further method steps, especially the forming of the oblique channels is done, according to the present invention, in a simple and, in view of production technology, economic manner.

The following is a detailed description of the preferred embodiments of the present porous member and the methods of its production, made with reference to the accompanying drawings. In the Figures:

BRIEF DESCRIPTION OF THE DRAWINGS

FIGS. 14 to 18 illustrate the individual production steps for forming a foamed plastic material member penetrated by oblique channels for the subsequent production of another embodiment of the porous member, FIGS. 21 to 24 are schematic illustrations of the individual production steps for forming a foamed plastic material member penetrated by oblique channels according to an alternative production method.

DESCRIPTION OF THE PREFERRED EMBODIMENTS

Figure 1:
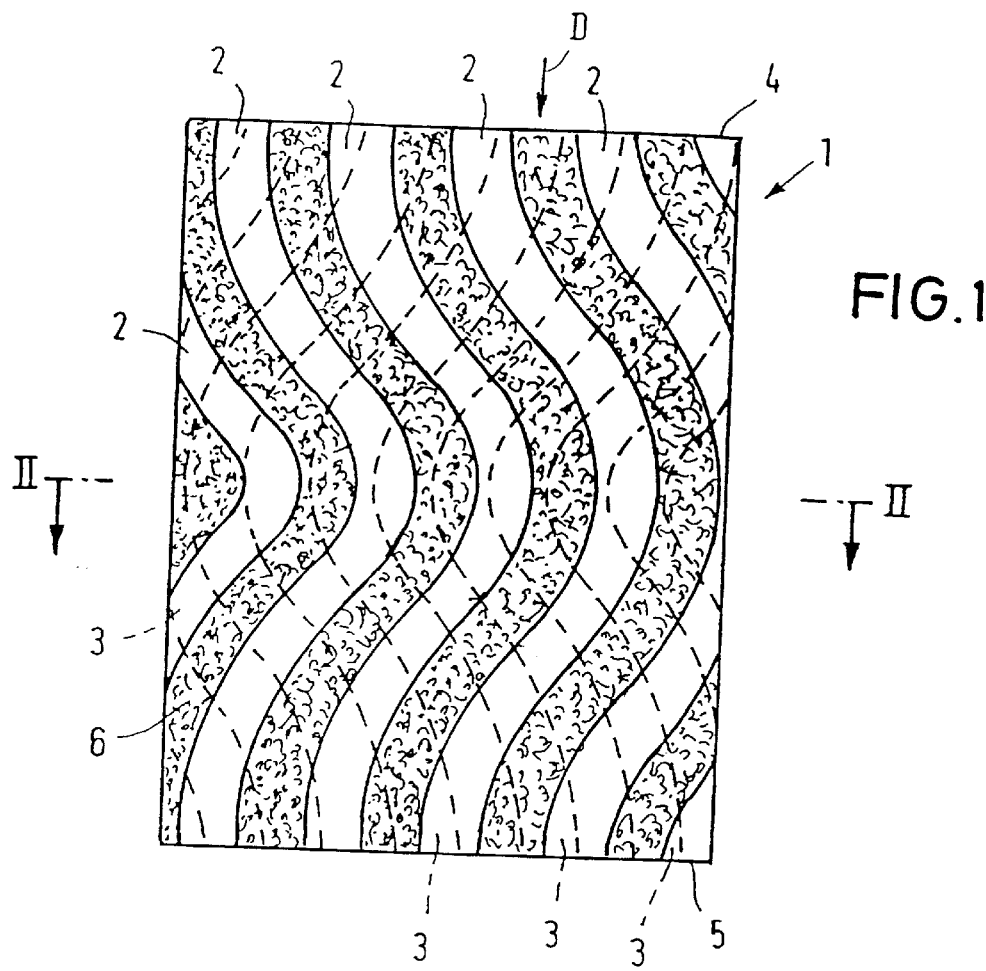
FIG. 1 is a schematic cross-sectional view of a first embodiment of a porous member according to the present invention.
Figure 2:
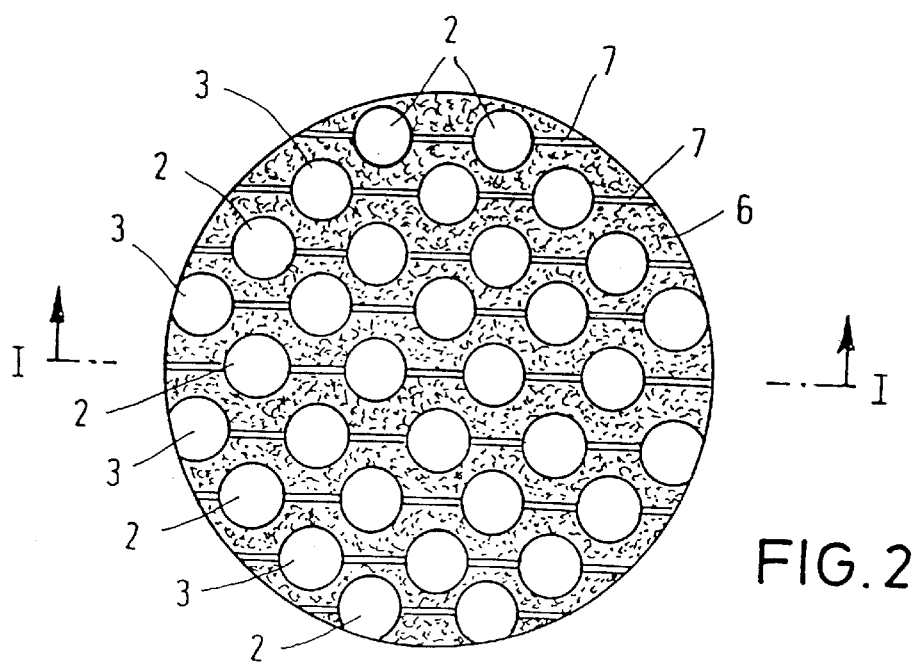
FIG. 2 is a schematic sectional view of the porous member of FIG. 1, taken along line II—II.

FIGS. 1 and 2 illustrate a first embodiment of a porous member 1. The porous member has wavy first channels 2 and second channels 3 that extend from an inlet surface 4 to an outlet surface 5. The channels 2 are located in the sectional plane of FIG. 1 and the channels 3 are behind this sectional plane. The wave-shape of the channels 2 and 3 is identical. The channels 2 and 3 are arranged offset with respect to each other so that the wave-shapes extend in opposite senses, i.e. they are not parallel in the longitudinal direction of the channels 2, 3. A medium flowing through the porous member 1, seen in the flow direction D, enters the porous member 1 at the inlet surface 4 and exits at the outlet surface 5. To homogenize the fluid, the wavy channels 2, 3 form an acute angle with the flow direction D over their entire extension. The channels 2, 3 extend along the center lines of the channels 2, 3 from the inlet surface 4 to the outlet surface 5. Since the channels 2, 3 are wavy, the acute angle varies relative to the flow direction D, the angle being 0 at each apex of the individual curves. Since the angle is 0 only at the apexes, but otherwise always is an acute angle other than 0° between the flow direction D and the extension of the channels 2, 3, a good mixing and homogenization of the fluids occurs. Since porous material 6 is provided between the channels, the fluid not only flows through the channels 2, 3, but also through the porous material 6 of the porous member 1 so that a connection is given between the channels 2, 3.

The second channels 3 are offset relative to the first channels 2 so that, seen in the flow direction D, an angle other than 0° exists between the channels 2, 3.

A further connection between the channels 3 or the channels 2 exists within a respective channel row (FIG. 2).

The production of the porous member illustrated in FIGS. 1 and 2 will be described with reference to FIGS. 5 to 9.

Figure 3:
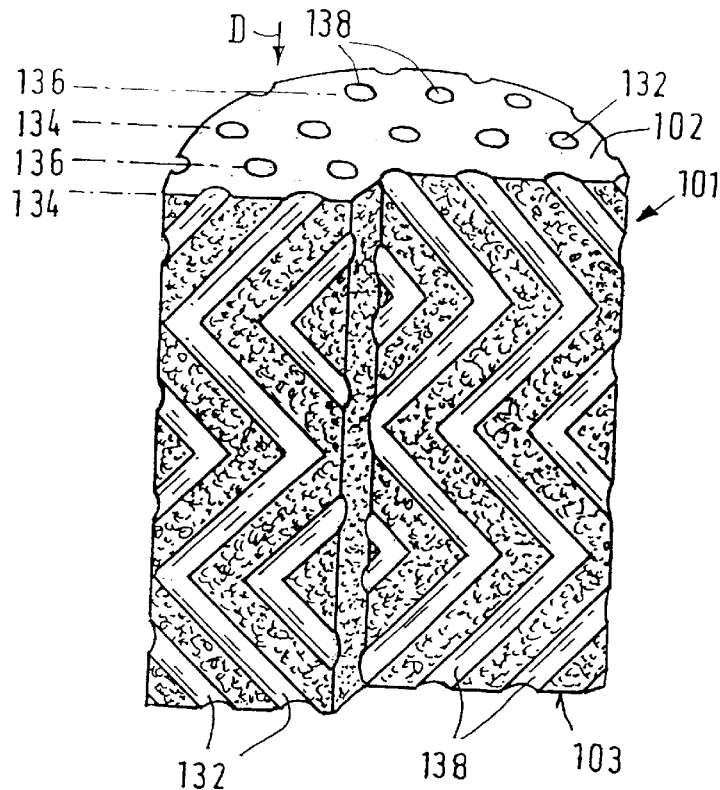
FIG. 3 is a schematic perspective sectional view of a second embodiment of the porous member according to the present invention.
Figure 4:
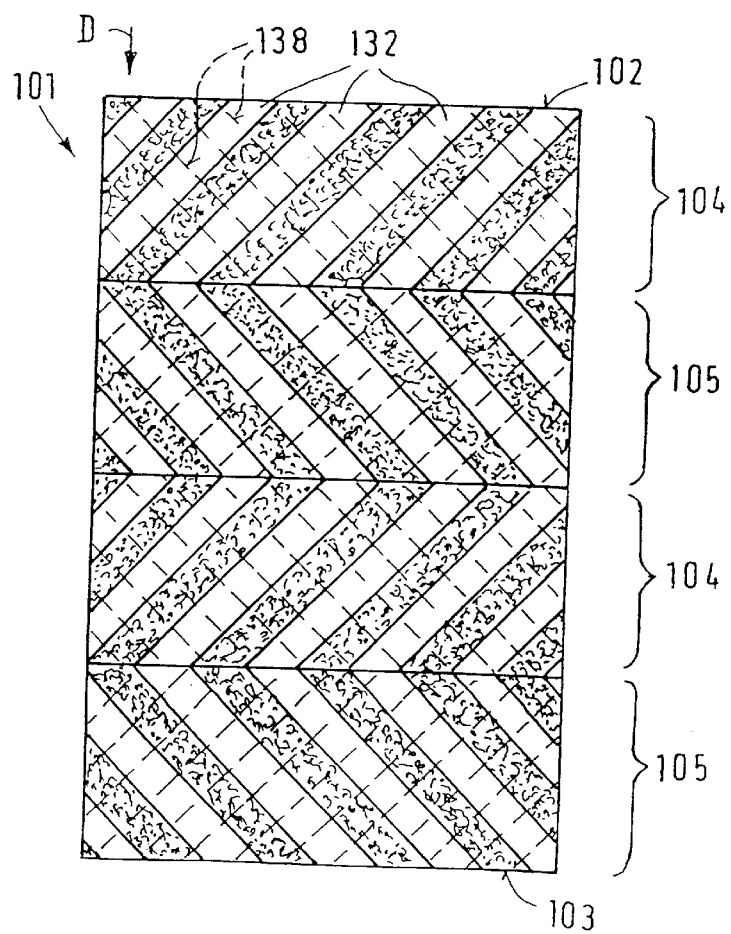
FIG. 4 is a schematic sectional view of the porous member illustrated in FIG. 3, FIGS. 5 to 9 are illustrations of the individual production steps for forming a foamed plastic material member penetrated by oblique channels from which the porous member illustrated in FIGS. 1 and 2 is made.

FIGS. 3 and 4 illustrate a second embodiment of a porous member 101 according to the present invention. The porous member 101 is penetrated by first channels 132 and second channels 138 from an inlet surface 102 towards an outlet surface 103. The channels 132, 138 always extend under an acute angle to the flow direction D. Since the channels 138, 132 are zigzag-shaped, the angle of the channels 132, 138 varies relative to the flow direction D along the extension of the channels 132, 138, i.e. along the center line of the channels 132, 138. The porous member 101, which is circular cylindrical seen in the flow direction D, may be subdivided into a plurality of sections 104, 105 (FIG. 4). Within these sections, the first channels 132 and the second channels 138 are always straight, the first channels 132 forming an angle of about 90° to the second channels 138 and an acute angle of about 45° to the flow direction D.

The sections 104, 105 may also be formed adjoining each other such that the channels 132, 138 of adjacent sections are offset but not zigzag-shaped. Fluid flowing through the channels 132, 138 of a section 104, 105 is thus forced to flow through a porous portion before reaching a channel 132, 138 of the adjacent section. At the bordering surfaces of adjacent sections, the channels may also partly overlap.

At the bordering surfaces of two adjacent sections 104, 105, the angle of the first channels 132 and the second channels 138 change. In the example illustrated in FIGS. 3 and 4, the change in angle is about 90°. Preferably, the change in angle is <90° so that an acute angle appears between the channels. The sections 104 and 105 are identical so that the sections 104, 105 recur periodically in the flow direction D. With an angle of about 90° between the channels in the contact surface of two adjacent sections 104, 105, the porous member 101 may be composed of identical parts. Here, the individual parts are arranged such that adjacent sections 104, 105 are mirror-inverted to the contact surface. Thus, the production of the individual sections is substantially simplified. The production of the porous member 101 will be described with reference to FIGS. 14 to 20.

Figure 5:
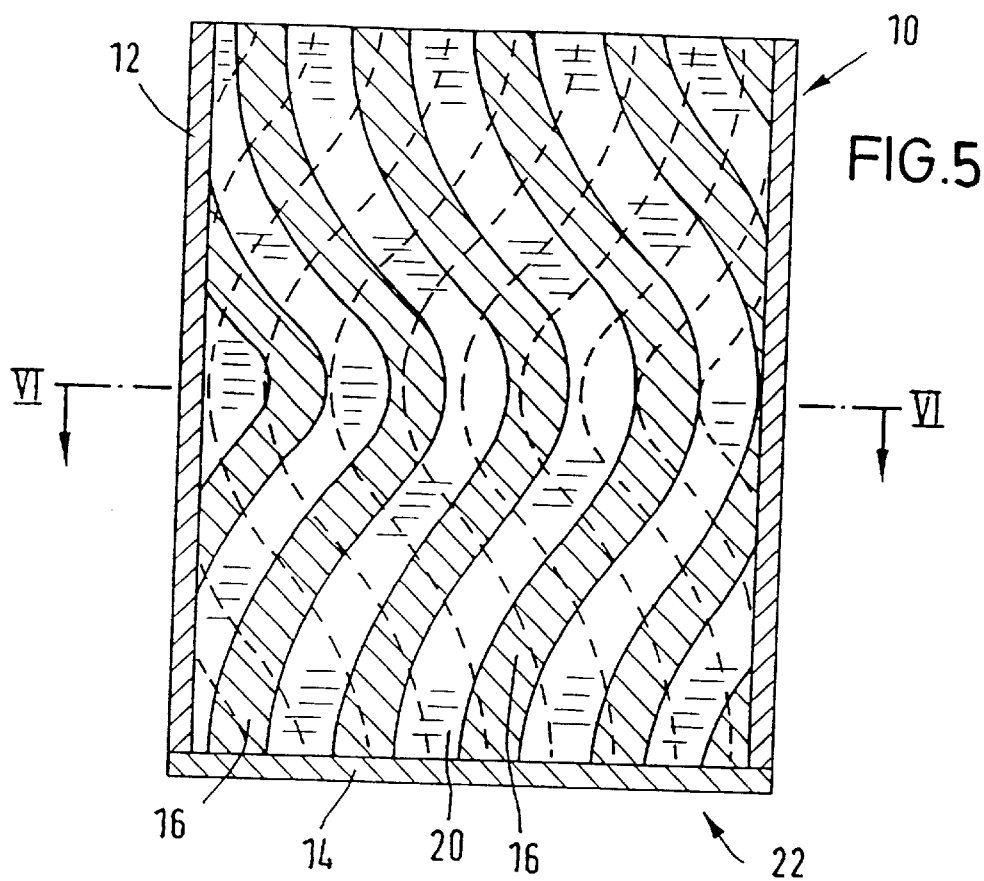
Figure 6:
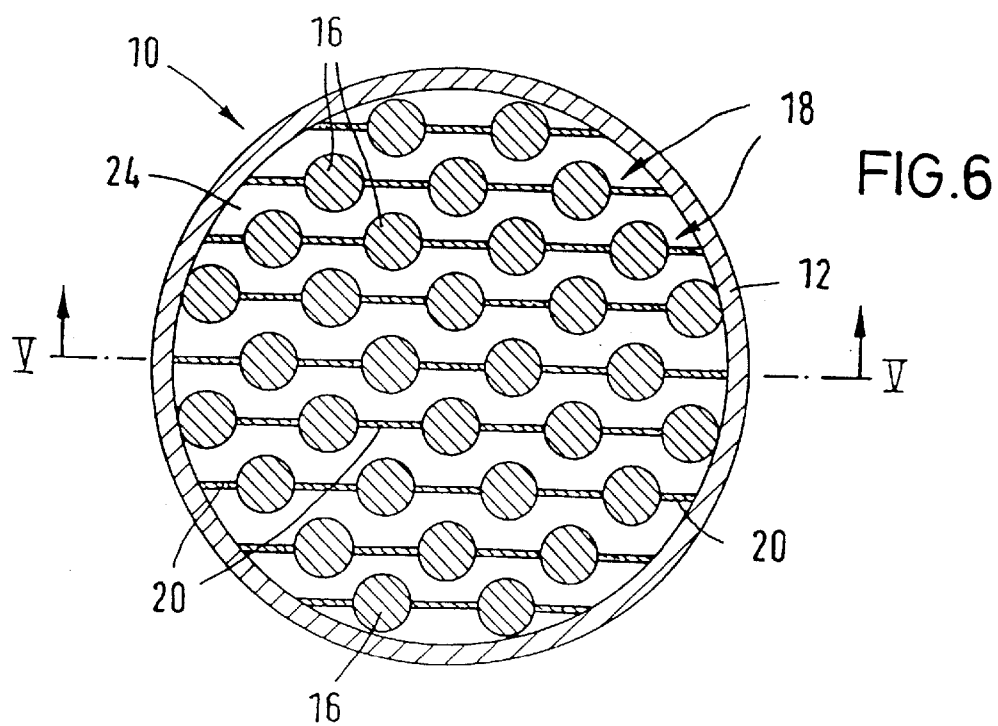
Figure 7:
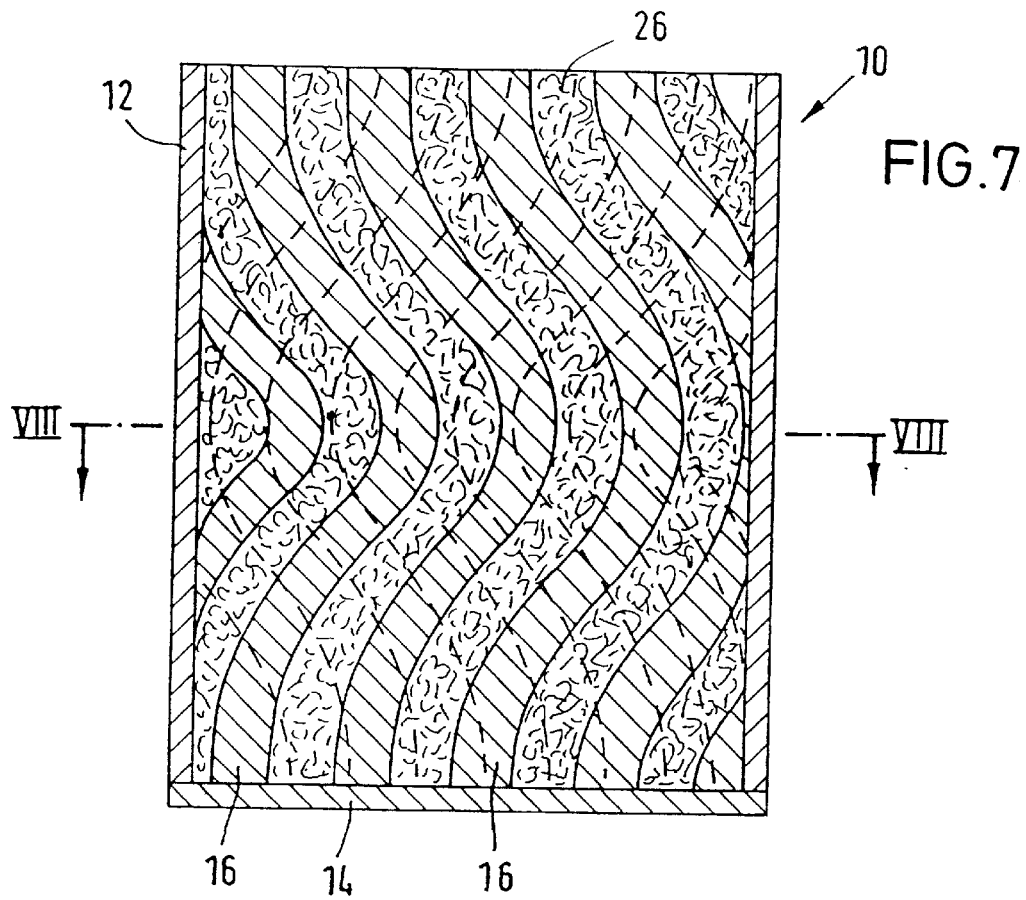
Figure 8:
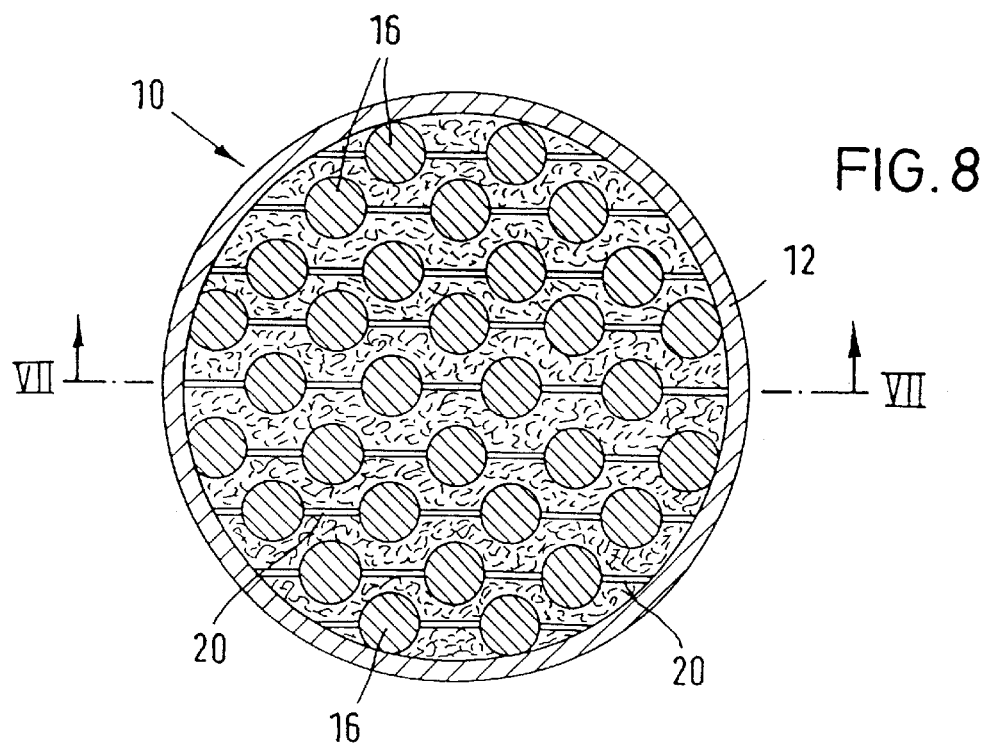

FIG. 5 is a longitudinal section through a cylindrical mold 10 formed by a sleeve 12 and a bottom member 14 closing one of the front ends thereof. A plurality of serpentine-shaped substantially beads 16 project from the bottom member 14 which, as is particularly evident from FIG. 6, are arranged side by side in a plurality of parallel rows 18. The serpentine-shaped beads 16 of each row 18 are interconnected by thin connecting webs 20. Like the beads 16, these thin connecting webs 20 extend over the entire axial length of the mold 10. Further, these thin connecting webs 20 extend from the beads 16 adjacent the sleeve 12 to the inner wall of the sleeve 12. The bottom plate 14 with its projecting beads 16 and the connecting webs 20 forms an insert member 22 for insertion into the sleeve 12 of the mold 10.

Figure 9:
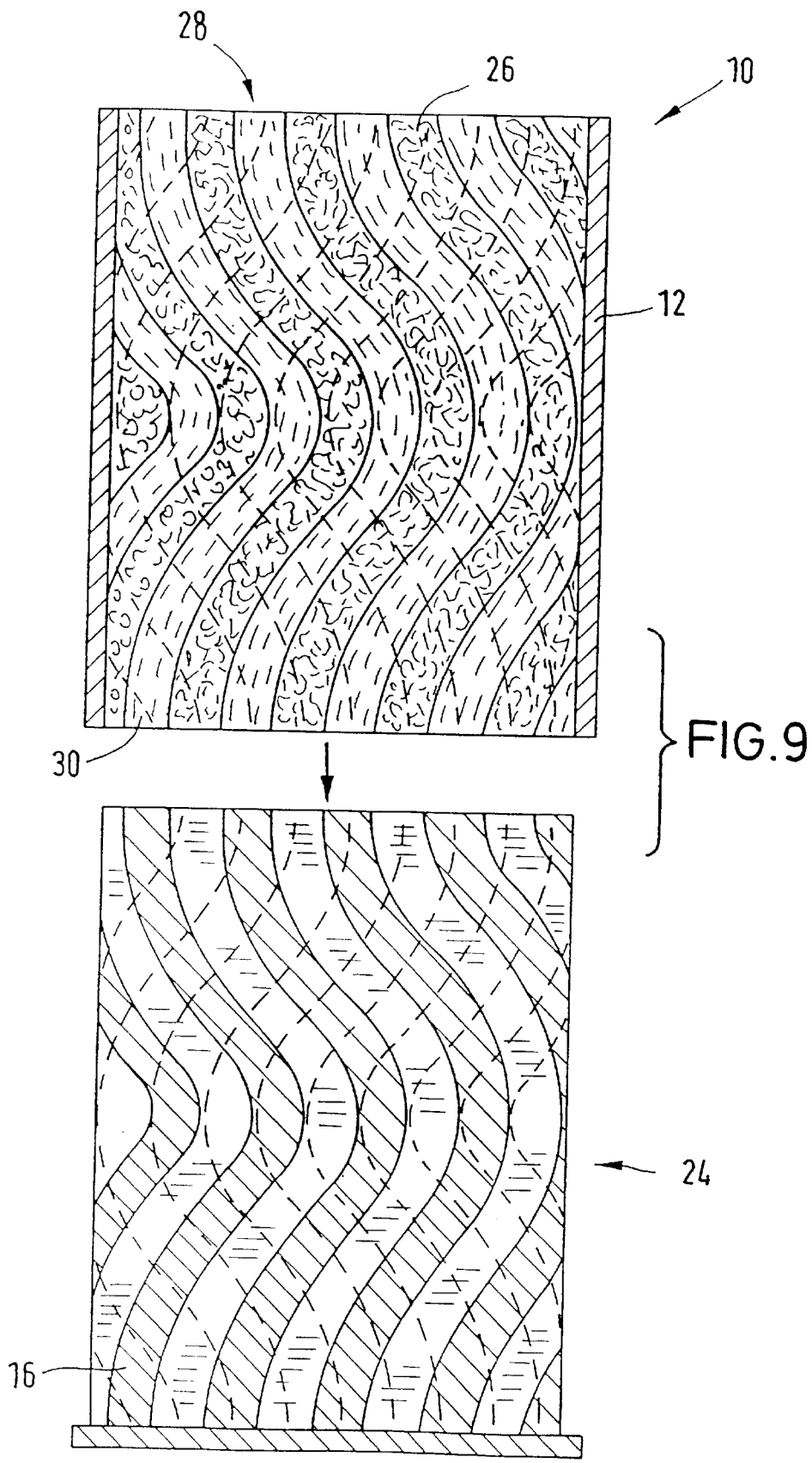

As is particularly evident from FIG. 6, cavities 24 are formed between adjacent rows 18 of beads 16 and connecting webs 20. In the step represented in FIG. 7, these cavities 24 are filled with a PU foamed plastic material 26. This foamed plastic material 26 remains flexible even after curing so that the entire insert member 22 can be pulled from the mold 10, as illustrated in FIG. 9. In this manner, a shaped PU member 28 is formed that has throughgoing channels 30, the path of which is determined by the extension of the beads 16.

Alternatively, it may be provided to remove the foamed plastic material 26 from the sleeve 12 together with the insert members 22 still embedded therein, and to remove the insert members 22 from the foamed plastic material 26 only subsequently. In principle, it can be a further advantage to design the sleeve 12 as two parts to facilitate the removal of the foamed plastic material 26, eventually together with the insert members 22.

Subsequently, this shaped PU member 28 is taken from the sleeve 12 of the mold 11 and drenched with ceramic slip. After the curing of the ceramic slip, the ceramic member is heated so that the foamed plastic material is removed by evaporation. The finished product then is a ceramic material porous member (FIGS. 1 and 2) penetrated by individual channels 30 which are in fluid communication with each other due to the porous structure of the ceramic material.

Figure 10:
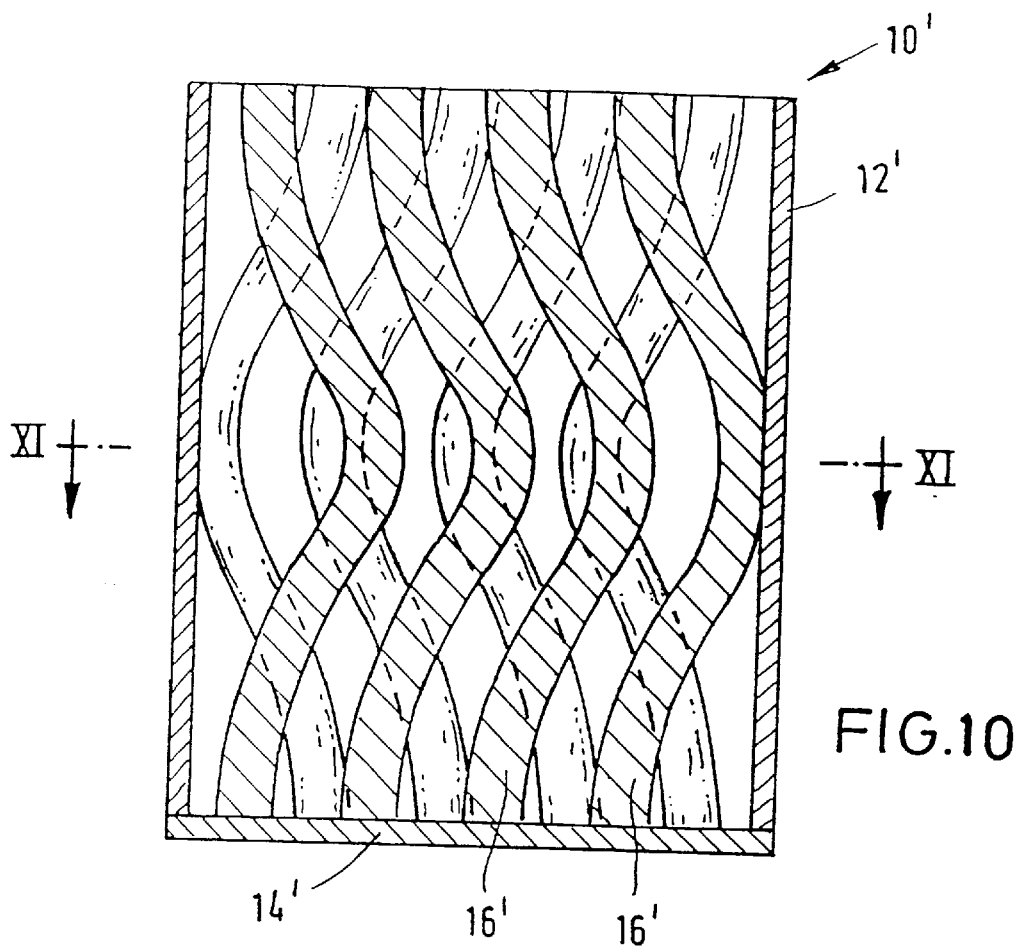
FIGS. 10 and 11 illustrate the molds and insert members necessary for producing a flexible foamed plastic material member with penetrating channels for making a further embodiment of the present porous member.
Figure 11:
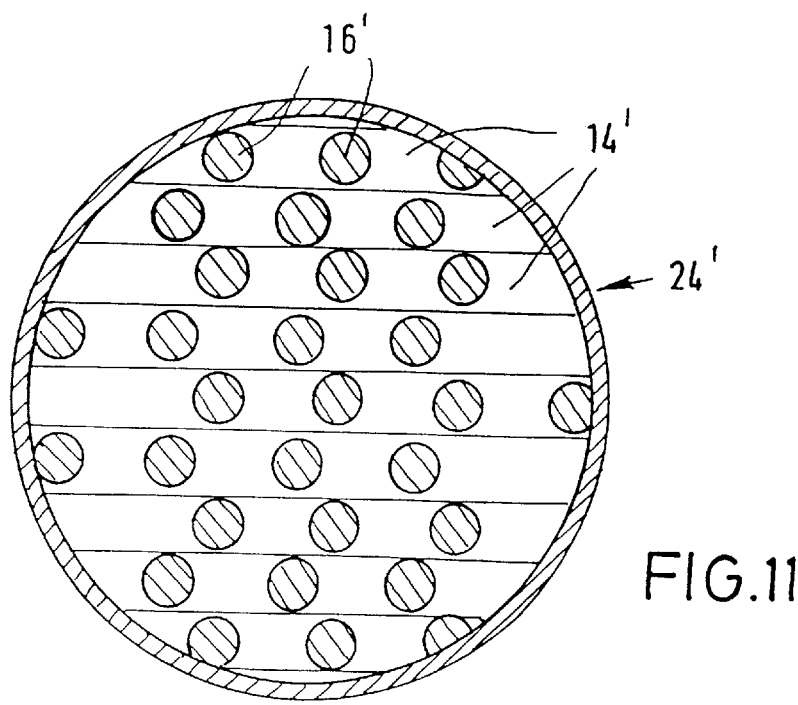

FIGS. 10 and 11 illustrate an alternative mold 10' to the mold 10, the former having a cylindrical wall 12. From one of the two front ends, a plurality of insert members 24' is placed into the mold 10', the insert members comprising a straight and narrow strip-shaped bottom member 14' with a plurality of projecting serpentine-shaped beads 16' that are cylindrical in section. The individual serpentine-shaped beads 16' may be interconnected by continuous webs, however, this is not imperative. As is visible in FIG. 11, the individual strip-shaped insert members 14' abut closely, thereby filling the entire cross section of the sleeve 12' of the mold 10'.

The technique of producing a ceramic foamed material member using the mold 10' of FIGS. 10 and 11 is performed analogously to the method of production described for FIGS. 5 to 9. After the foamed plastic material has cured, while it is still flexible, the individual insert members 24' are pulled out. The foamed plastic material member thus obtained is then wetted with ceramic slip by drenching so as to be heated after curing in order to remove the foamed plastic material.

Figure 12:
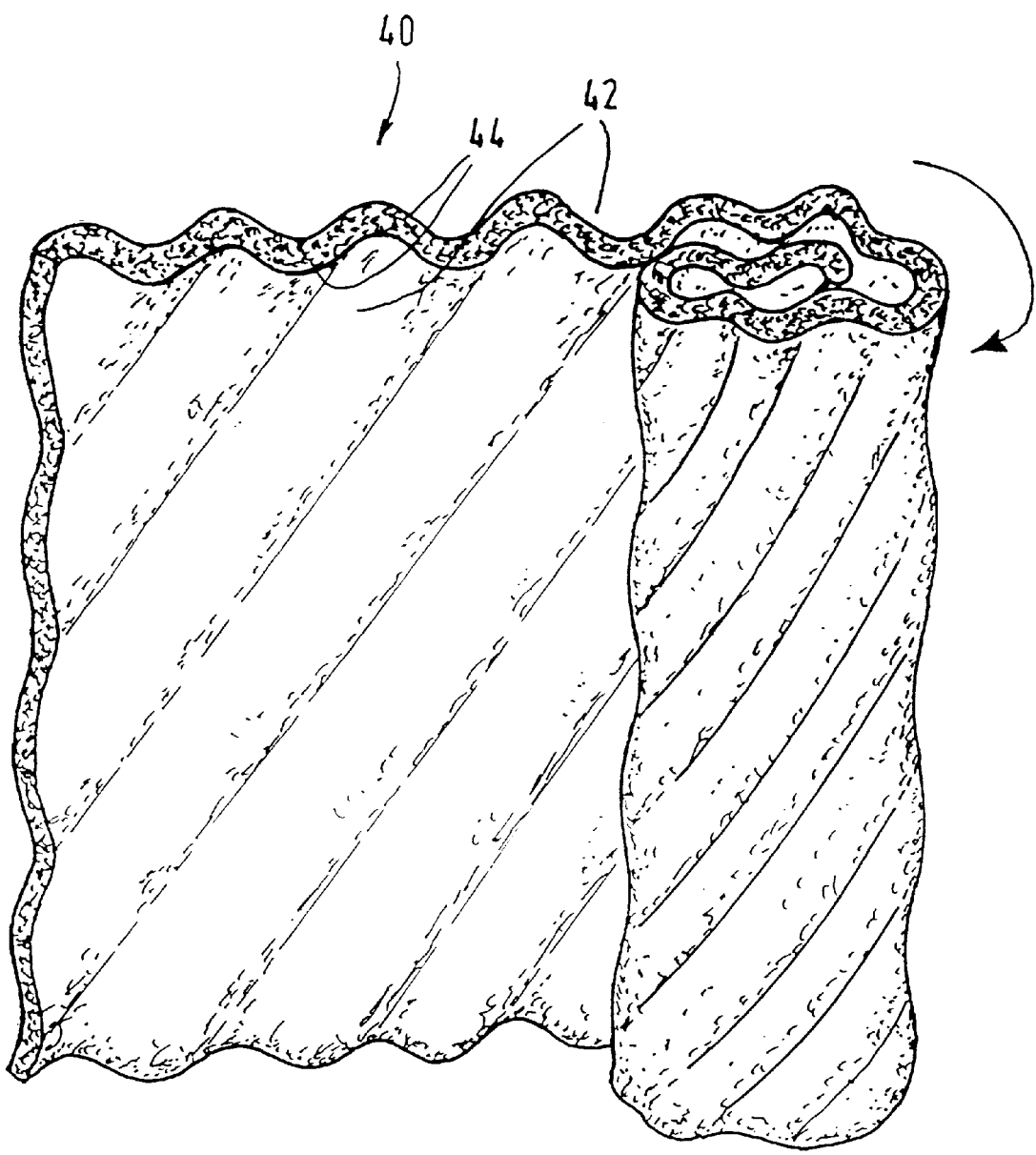
FIGS. 12 and 13 illustrate the production of a flexible foamed plastic material member with penetrating channels, i.e. by winding, to make another embodiment of the present porous member.
Figure 13:
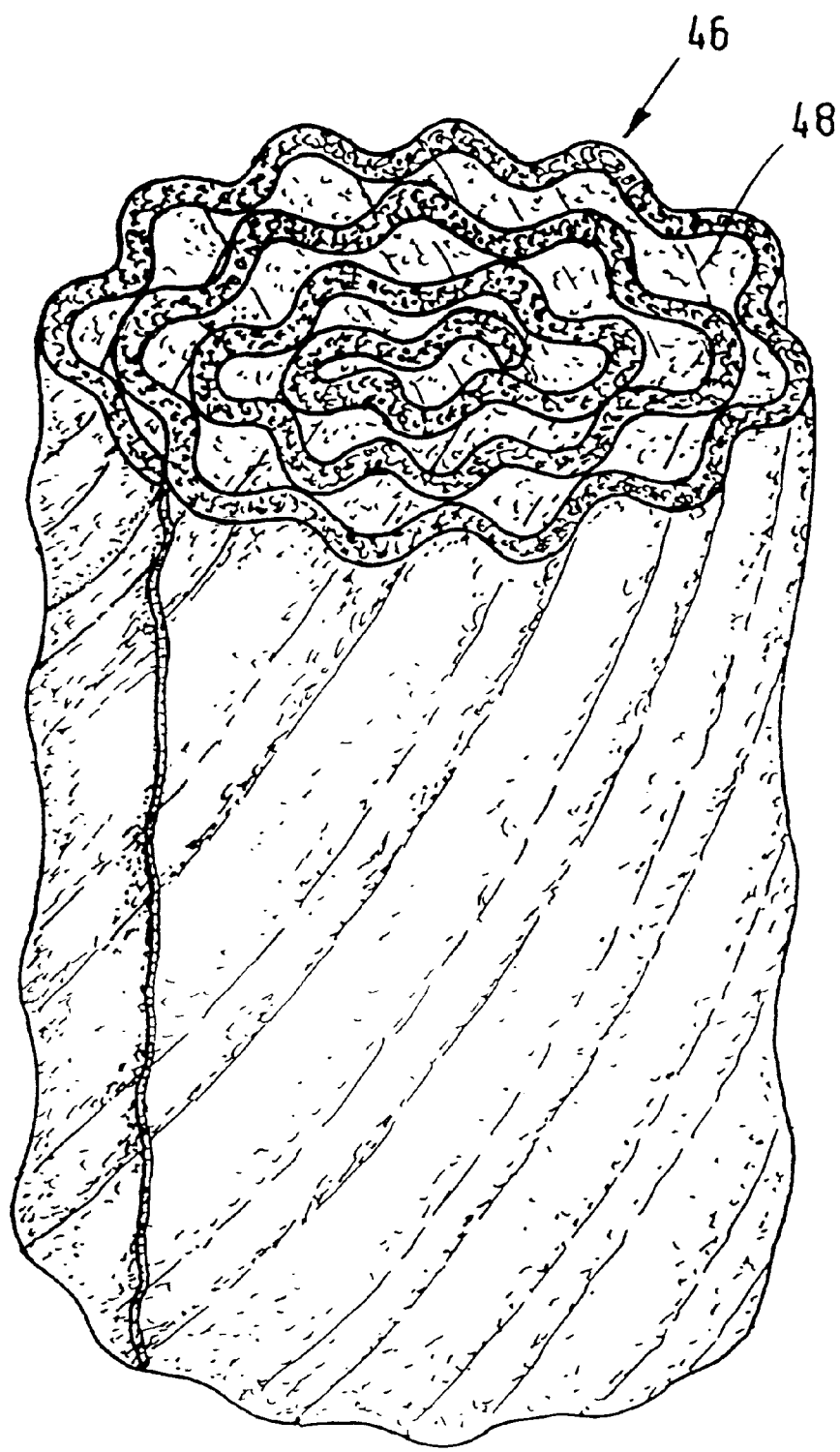

FIGS. 12 and 13 represent another alternative to the method of production of a ceramic foamed material member.

This production variant first provides for creating a wavy mat 40 of flexible foamed plastic material. This mat 40 has angularly extending straight recesses 42 and raised portions 44. Winding the mat 40 into a wound member 46 (see FIG. 9) yields a structure of foamed plastic material penetrated in its axial direction by a plurality of channels 48. The wound member 46 is fixed in its shape particularly by means of adhesive and is wetted with ceramic slip. The ceramic foam thus obtained after curing is heated to remove the plastic material by evaporation.

The methods for producing a porous member according to the invention, described in connection with FIGS. 14 to 24, use foamed material which is produced in blocks in standard production sizes (for example, 60 m×1.5 m×0.8 m). In particular, this foamed material is closed-cell material processed in a second process known per se with controlled pressure waves or explosions so that the closed cells of the foamed material are opened. Thus, a block of foamed material with open pores is obtained.

This foamed material block is cut, for example, to foamed material mats 110 (also referred to above as foamed material member or foamed plastic material member) of 25 mm in thickness (plate material). According to the method of FIGS. 14 to 18, each of these mats 110 is placed into a tool 112 comprising two parallel perforated pressing or contact plates 114, 116 adapted to be approached and moved apart. The upper perforated plate 114 contacts the top surface 118 of the foamed material mat 110, while the lower perforated plate 116 contacts the bottom surface 120 of the foamed material mat 110. This situation is depicted in FIG. 14.

By moving at least one of the perforated plates 114, 116 in the plane of their extension, the foamed material mat 110 is sheared as illustrated in FIG. 15 To this end, the plates 114, 116 must contact the foamed material mat 110 with a certain static friction. It is possible, for example, to provide the plates 114, 116 with thorns or similar projections that penetrate into the top or bottom surface 118, 120 where they hook.

After relative displacement of the two plates 114, 116, the holes 122 in the upper plate 114 are flush with the holes 124 provided in the lower plate 116. Thereafter, the plates 114, 116 are approached so that the foamed material mat 110 therebetween is compressed in the sheared state by elastic deforming (not illustrated in the Figs.). Now, a punching tool 126 may be advanced through the coincident holes 122, 124 and the foamed material mat 110 provided therebetween. The punching tool 126 comprises a support plate 128 with, in particular, tubular cutting or punching elements 130 projecting from the support plate 128 according to the pattern and the arrangement of the holes 122 and 124. Using these cutting and punching elements 130, first channels 132 may be formed in the sheared foamed material mat 110, as illustrated in FIG. 15.

After this process, the two pressing plates 114, 116 are returned to their home positions so that the foamed material mat 110 again takes its initial shape (relaxed state). As illustrated in FIG. 16, the channels 132 formed in the direction of the normal to the top and bottom surfaces 118, 120 of the sheared foamed material mat 110 now extend obliquely, the angle depending on the shearing previously applied to the mat 110.

Thus, the process described above unwinds such that the foamed material mat 110 is first more or less strongly compressed by the pressing plates 114, 116 and sheared to take a trapezoidal shape. Then, the punching is performed in the direction of the normal to the top and bottom surfaces of the foamed material mat 110. After the withdrawal of the punching tool 126 and after the foamed material mat 110 has relaxed, channels 132 are provided therein with an orientation under an angle to the normal of the top and bottom surfaces of the foamed material mat 110.

According to the above process, a first group of first channels 132 arranged in a plurality of first rows 134 are formed in the foamed material mat 110. A plurality of second channel rows 136 with second channels 138 orientated opposite to the previous channel rows 134, are created by shearing the foamed material mat 110 between the pressing plates 114, 116 in the direction opposite to that of the former step and by subsequently forming the channels 132 using the punching tool 126 that is moved transverse to the traveling direction of the pressing plates 114, 116 (FIG. 17). Thus, the foamed material mat 110 may be provided with a plurality of adjacent rows 134, 136 of channels 132, 134, the first channels 132 of one and the same row extending in parallel, while the second channels 138 of adjacent rows 136 are orientated in the opposite direction.

Figure 19:
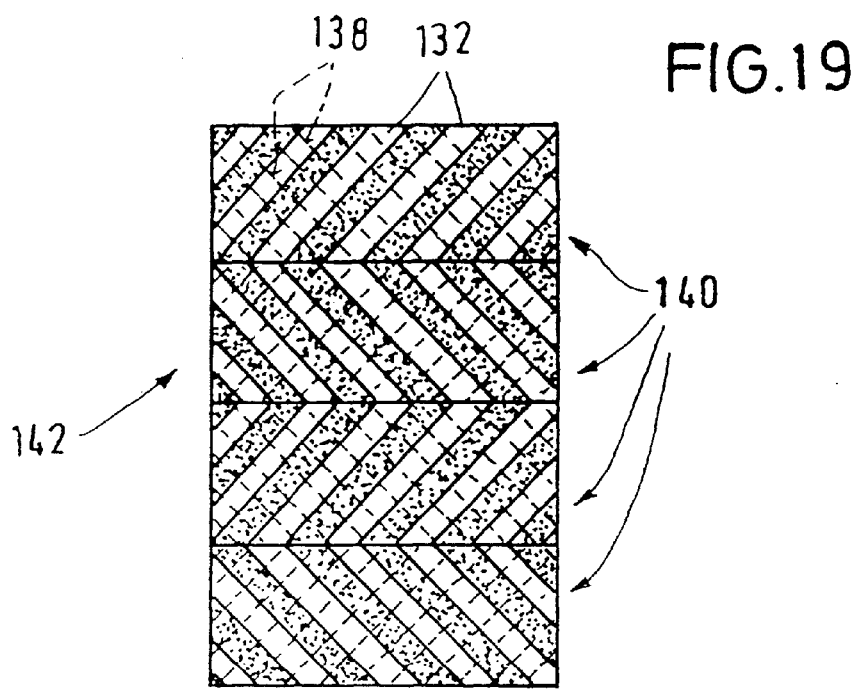
FIG. 19 is a sectional view through a foamed material member formed from a plurality of foamed plastic material members according to FIGS. 14 to 18.
Figure 20:
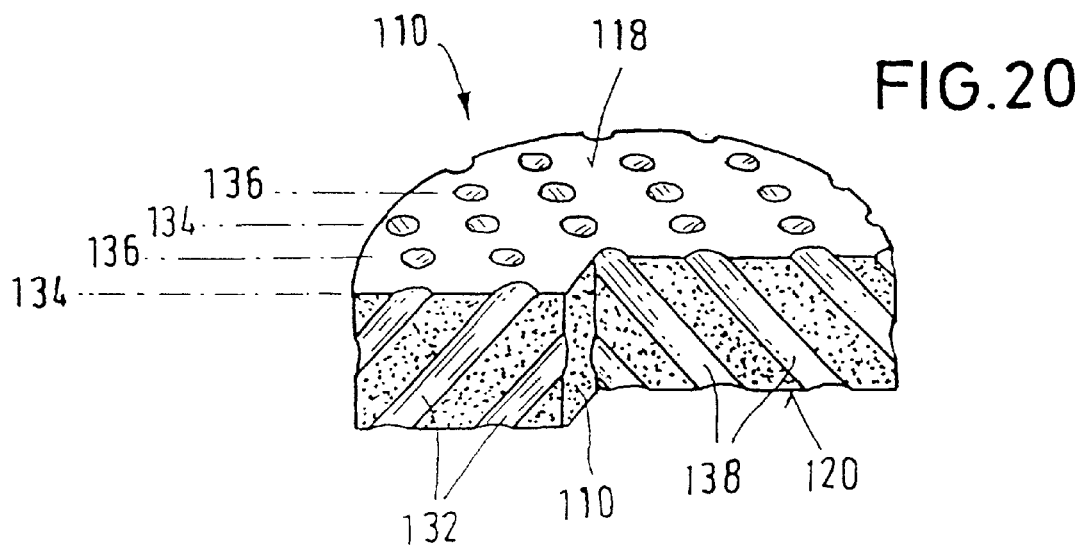
FIG. 20 is a perspective view of a foamed plastic material member, partly broken away.

Pieces are cut from the foamed material mats 110 made according to the above described method, the shape of which corresponds to the cross section of the member through which fluid is to flow. For example, cylindrical members 140 may be cut from the foamed material mats 110 (FIG. 20). In FIG. 19, a plurality of such cylindrical members 140 are abutted axially so that the arrangement of cylindrical members 142 thus obtained is penetrated by channels that, in portions, run in zigzag and, thus, in opposite senses.

In a further step, the entire structure 142 is wetted with slip that is cured subsequently. The cured slip connects the individual cylindrical pieces 140 which form a single unit, namely the porous member (FIGS. 3 and 4). The slick is burned out so that a member is obtained that is made of ceramic foamed material. This member has no plastic material on itself, since the same evaporates during burning.

An alternative production process for making a foamed material member 110' with penetrating first and second channels 132, 138 is described in the following in connection with the schematic illustrations in FIGS. 21 to 24. Starting from a block foam material 144, first channels 132 are formed in one of its outer surfaces 146. These channels 132 extend substantially at right angles to the extension of the outer surface 146 in which they are formed. Subsequently, the foamed block 144 is cut along line 148. After rotation of the cut foamed block 144 in the direction of the arrow 150 in FIG. 21, the situation of FIG. 22 is obtained, in which the cutting surface 152 defined by the cutting surface 148 is arranged on top and extends under an acute angle to the extension for the first channels 132.

Figure 21:
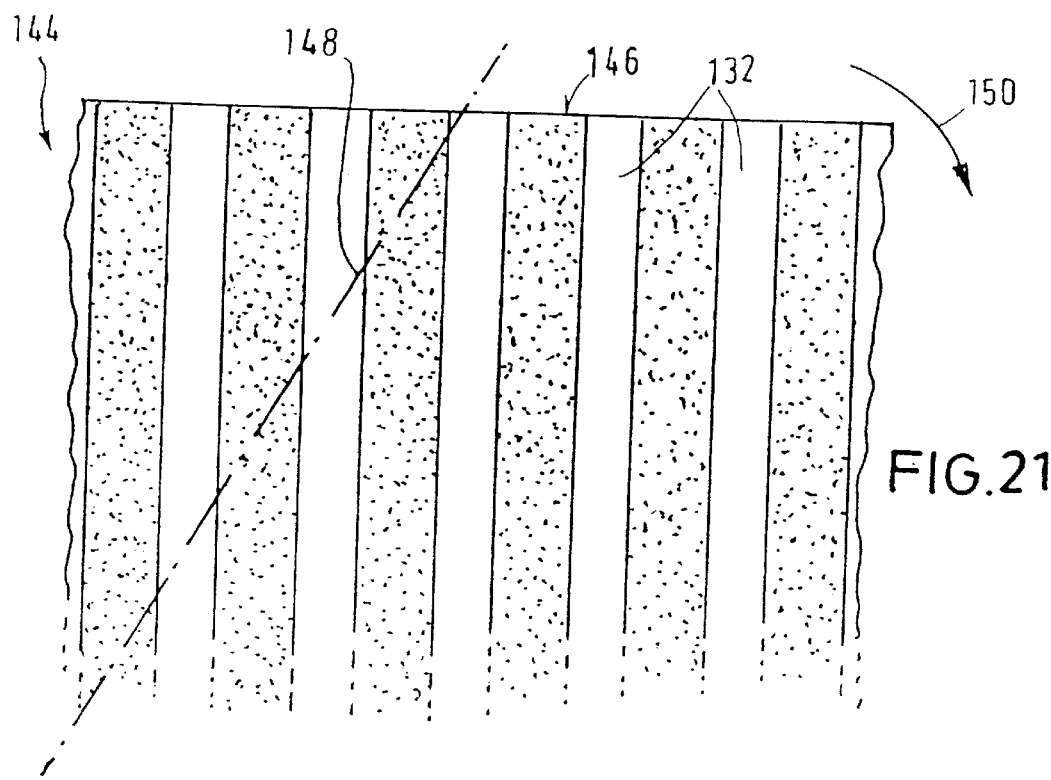
Figure 22:
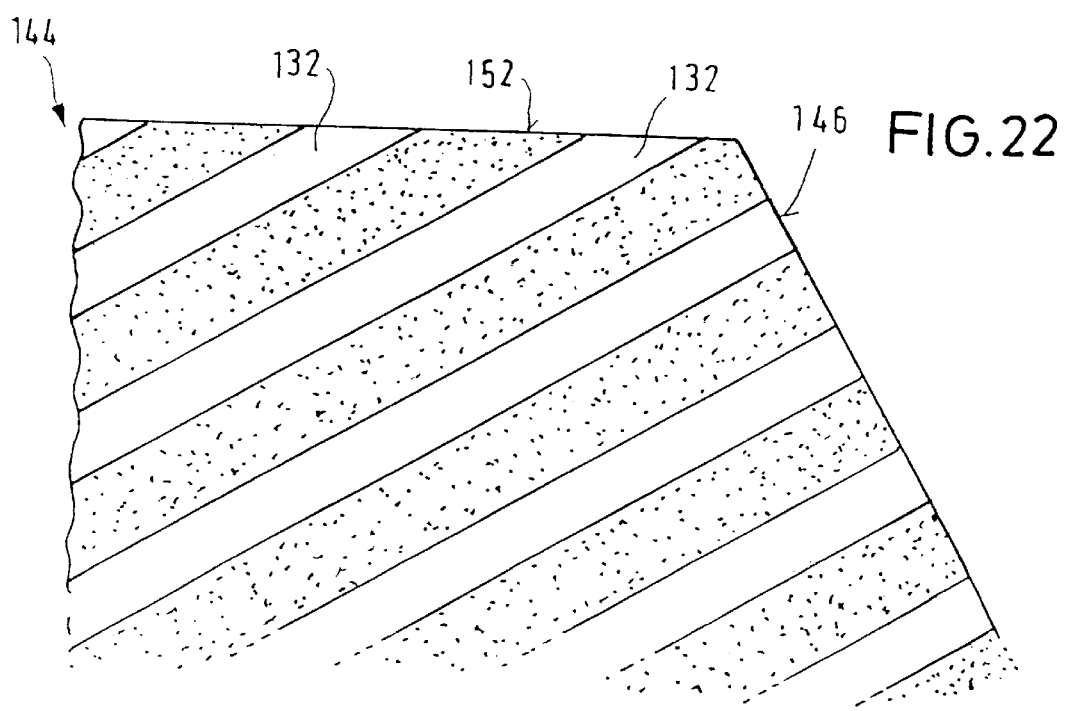

According to FIG. 21, second channels 138 are then formed in this cutting surface 152, which channels in turn extend substantially at right angles to the cutting surface 152. Thereafter, the foamed block 144 thus penetrated by the first and second channels 132, 138 is cut along the line 154. After rotation of the thus cut foamed block 144 in the direction of the arrow 156, the situation illustrated in FIG. 24 is obtained, where the cutting surface 158 resulting at the cutting surface 154 is on top. By suitable trimming, the foamed material mat 110' is obtained that is penetrated by crossing first and second channels 132, 138.

The foamed member thus produced is then wetted with slip and cured.

Figure 25:
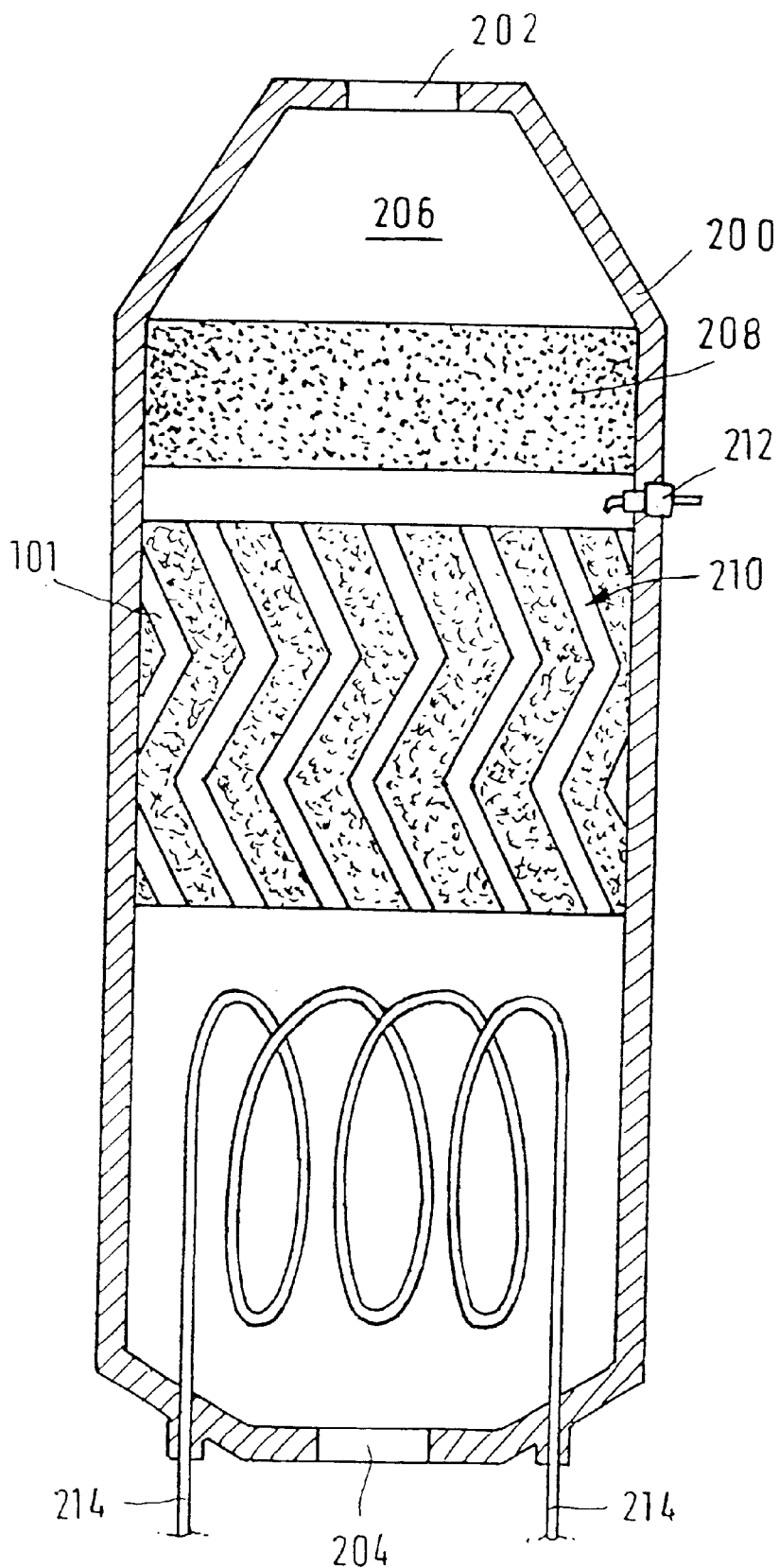
FIG. 25 is a schematic illustration of a pore burner with a porous member arranged in the heating chamber thereof.

The above described porous member of temperature-resistant, in particular ceramic material is particularly suited for use in a pore burner (FIG. 25). Such pore burners are employed in heating installations, for example, since the nominal capacity of pore burners can be adjusted over large ranges with low emission of pollutants. A pore burner comprises a housing 200 with an inlet 202 and an outlet 204. A mixture of gas and air is supplied to the pore burner via the inlet 202. The mixture of gas and air reaches a pre-chamber 206 of the housing 200 and then flows through a flame retention baffle or a plate with holes 208. The flame retention baffle 208 serves as a backfire means that prevents the flames from backfiring into the prechamber 206. After having passed the flame retention baffle 208, the mixture of gas and air reaches a combustion chamber 210, where it is ignited by an ignition means 212. For the homogenization of the combustion in the combustion chamber 210, a porous member 101 according to the present invention is located therein. The example of a pore burner illustrated in FIG. 25 uses a porous member 101 illustrated in FIGS. 3 and 4. One may also use another embodiment of the porous member.

When exhausting the combustion gases from the combustion chamber 210, the combustion gases pass by a heat exchanger 214 and exhausted through the outlet 204. A heat transfer fluid flows through the heat exchanger 214. When the pore burner is used in conventional heating installations, the heat exchanger 214 is connected directly with the water circuit of the heating installation.

Figure 26:
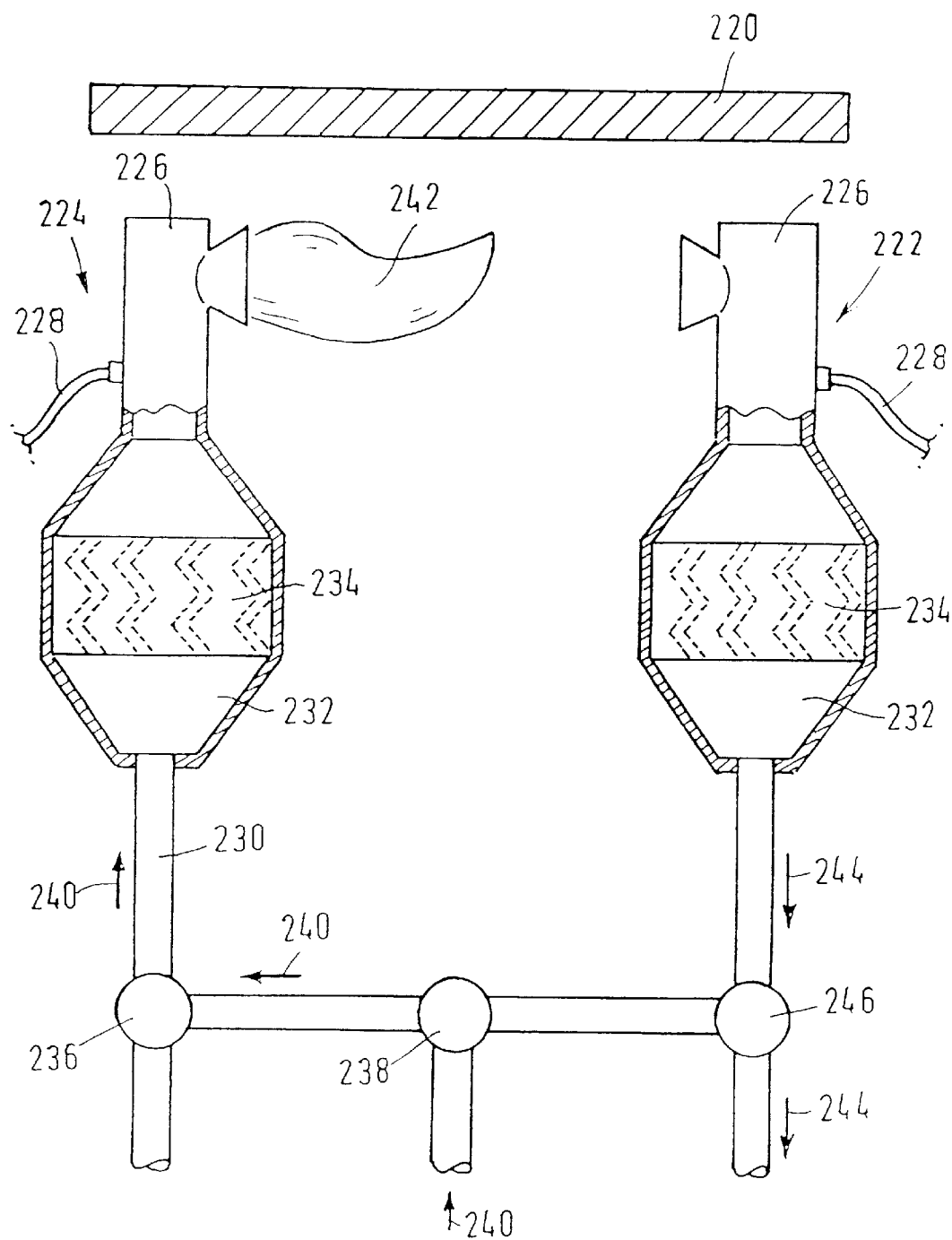
FIGS. 26 and 27 are schematic illustrations of the two cycles of a regenerative radiant burner wherein porous members are used as heat accumulators.
Figure 27:
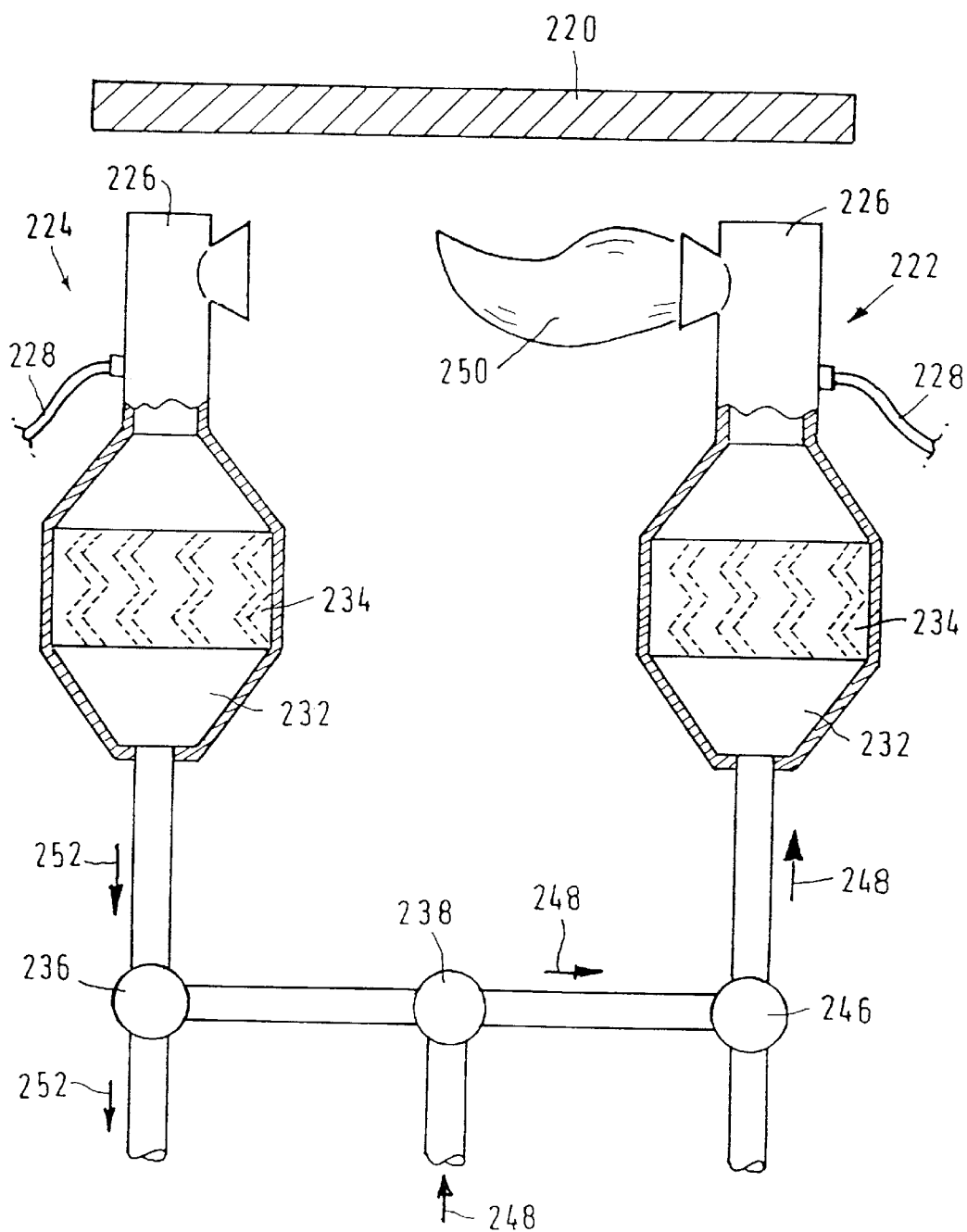

FIGS. 26 and 27 respectively illustrate the first and the second cycle of a radiant burner. Radiant burners are used to heat stock material 220, such as steel ingots. The two radiant burners 222, 224 are identical in structure, each having a burner head 226 to which fuel is supplied through a supply line 228. In the burner head 226, the fuel is gasified and ignited.

In the first cycle (FIG. 26), the fresh air is supplied to a pre-chamber 232 of the radiant burner 224 via a line 230. The pre-chamber 232 accommodates a porous member according to the invention that serves as a heat exchanger 234. The fresh air flows through the heat exchanger 234 into the burner head 236. The fresh air supply to the pre-chamber 232 is effected in the direction of the arrows 240 through a blower and correspondingly controlled valves 236, 238.

The radiant heat emitted by the flame 242 heats stock material 220. The flue gases occurring during combustion are drawn into the burner head 226 of the radiant burner 222 and passed through the heat exchanger 234 of the radiant burner 222. In the process, the heat exchanger 234 is heated by the flue gases. The flue gases are exhausted in the direction of the arrows 244, a valve 246 being controlled accordingly so that no mixing of the fresh air supplied to the radiant burner 224 and the flue gases exhausted through the radiant burner 222 occurs.

In the second cycle (FIG. 27), the functions of the two radiant burners 222, 224 are switched. The radiant burner 222 is supplied with fresh air in the direction of the arrows 248, the valves 238 and 246 being controlled correspondingly. The fresh air reaches the prechamber 232 of the radiant burner 222 and is passed through the heat exchanger 234, heating up in the process. In the burner head 226 of the radiant burner 222, the fresh air serves to gasify the fuel supplied through the supply line 228. The mixture of gas and air is then ignited so that the radiant heat of the flame 250 again heats the stock material 220. By preheating the fresh air, the efficiency of the radiant burner can be increased significantly.

In the second cycle (FIG. 27), the flue gases are exhausted through the radiant burner 224 with the heat exchanger 234 of the radiant burner 224 being heated. Thereafter, the flue gases are exhausted in the direction of the arrows 252, the valve 236 being controlled accordingly. After termination of the second cycle, the radiant burners 222, 224 are again operated in the first cycle so that an interval operation is performed in which the fresh air supplied to the respective radiant burner is preheated.

Although a preferred embodiment of the invention has been specifically illustrated and described herein, it is to be understood that minor variations may be made in the apparatus without departing from the spirit and scope of the invention, as defined the appended claims.

I claim:

1. A member for filtering or mixing fluids comprising a body of temperature-resistant porous ceramic foam material, said porous body having a planar inlet surface (102) and an opposite planar outlet surface (103), a plurality of channels (132, 138) extending between said inlet and outlet surfaces (102, 103, respectively) through which fluid is adapted to flow in a flow direction (D) from said inlet surface (102) to said outlet surface (103), said plurality of channels (132, 138) including a first plurality of channels (132) and a second plurality of channels (138), and said first plurality and second plurality of channels (132, 138, respectively) being located in immediately adjacent alternating substantially parallel planes and in crossing relationship to each other from plane-to-plane as viewed normal to said planes.

2. The member as defined in claim 1 wherein each channel of said first plurality and second plurality of channels (132, 138, respectively) are disposed at an acute angle to the flow direction (D).

3. The member as defined in claim 1 wherein the channels of at least one of the first plurality of channels (132) and the second plurality of channels (138) are in parallel relationship to each other.

4. The member as defined in claim 1 wherein the channels of each of the first plurality of channels (132) and the second plurality of channels (138) are in parallel relationship to each other.

5. The member as defined in claim 1 wherein at least some of said channels are of a cylindrical cross-sectional configuration.

6. The member as defined in claim 1 wherein the porous body is made of zirconia oxide.

7. The member as defined in claim 1 wherein the porous body is made of silicon carbide.

8. The member as defined in claim 1 including another body of temperature-resistant porous ceramic foam material, said another porous body having an inlet surface (102) and an opposite outlet surface (103), a plurality of channels (132, 138) extending between said last-mentioned inlet and outlet surfaces (102, 103, respectively) through which fluid is adapted to flow in said flow direction (D) from said last-mentioned inlet surface (102) to said last-mentioned outlet surface (103), said last-mentioned plurality of channels (132, 138) including a first plurality of channels (132) and a second plurality of channels (138), said last-mentioned first plurality and said last-mentioned second plurality of-channels (132, 138, respectively) being located in immediately adjacent alternating substantially parallel planes and in crossing relationship to each other as viewed normal to said last-mentioned planes, and said first-mentioned porous body and said another porous body being disposed with their respective outlet and inlet surfaces (102, 103) contiguous each other and with the respective first-mentioned and last-mentioned plurality of channels (102, 103, respectively) being disposed in fluid communication with each other.

9. The member as defined in claim 2 wherein the channels of at least one of the first plurality of channels (132) and the second plurality of channels (138) are in parallel relationship to each other.

10. The member as defined in claim 2 wherein the channels of each of the first plurality of channels (132) and the second plurality of channels (138) are in parallel relationship to each other.

11. The member as defined in claim 2 wherein at least some of said channels are of a cylindrical cross-sectional configuration.

12. The member as defined in claim 3 wherein at least some of said channels are of a cylindrical cross-sectional configuration.

13. The member as defined in claim 4 wherein at least some of said channels are of a cylindrical cross-sectional configuration.

14. A method of manufacturing a porous member of temperature resistant material for filtering or mixing fluids comprising the steps of:
(a) providing a member made of porous flexible foamed plastic material including opposite outer surfaces disposed in a first position relative to each other,
(b) applying a first shear force to the porous member causing relative spacial displacement of the outer surfaces from the first relative position in a first direction substantially parallel to the direction of shear force application to a second relative position,
(c) forming a first plurality of spaced openings through the porous member while the first and second outer surfaces are in the second relative position thereof,
(d) restoring the porous member to its presheared condition,
(e) applying a second shear force to the porous member causing relative spacial displacement of the outer surfaces from the first direction and substantially parallel to the direction of shear force application to a relative position,
(f) forming a second plurality of spaced openings through the porous member while the first and second outer surfaces are in the third relative position thereof,
(g) restoring the porous member to its presheared condition at which the first and second plurality of openings are in crossing relationship to each other,
(h) wetting the porous member with a temperature resistant material, and
(i) curing the temperature resistant material to form a porous member of temperature resistant material for filtering or mixing fluids.

15. The method as defined in claim 14 wherein forming steps (c) and (f) are performed in alternating spaced substantially parallel planes.

16. The method as defined in claim 14 wherein the first plurality of spaced openings are in substantially parallel relationship to each other.

17. The method as defined in claim 14 wherein the second plurality of spaced openings are in substantially parallel relationship to each other.

18. The method as defined in claim 14 wherein the first plurality of spaced openings are in substantially parallel relationship to each other, and the second plurality of spaced openings are in substantially parallel relationship to each other.

19. The method as defined in claim 14 wherein each of the second and third relative positions are located a substantially identical distance from the first relative position.

20. The method as defined in claim 14 wherein one of the second and third relative positions is located a different distance from the first relative position as compared to another of the second and third relative positions relative to the first relative position.

21. The method as defined in claim 14 wherein at least one of said first and second plurality of openings defines an acute angle to one of said first and second outer surfaces after the performance of restoring step (g).

22. The method as defined in claim 14 wherein each of said first and second plurality of openings define an acute angle to one of said first and second outer surfaces after the performance of restoring step (g).

23. The method as defined in claim 15 wherein the first plurality of spaced openings are in substantially parallel relationship to each other.

24. The method as defined in claim 15 wherein the second plurality of spaced openings are in substantially parallel relationship to each other.

25. The method as defined in claim 15 wherein the first plurality of spaced openings are in substantially parallel relationship to each other, and the second plurality of spaced openings are in substantially parallel relationship to each other.

26. The method as defined in claim 15 wherein each of the second and third relative positions are located a substantially identical distance from the first relative position.

27. The method as defined in claim 15 wherein one of the second and third relative positions is located a different distance from the first relative position as compared to another of the second and third relative positions relative to the first relative position.

28. The method as defined in claim 15 wherein at least one of said first and second plurality of openings defines an acute angle to one of said first and second outer surfaces after the performance of restoring step (g).

29. The method as defined in claim 15 wherein each of said first and second plurality of openings define an acute angle to one of said first and second outer surfaces after the performance of restoring step (g).

30. The method as defined in claim 23 wherein each of the second and third relative positions are located a substantially identical distance from the first relative position.

31. The method as defined in claim 23 wherein one of the second and third relative positions is located a different distance from the first relative position as compared to another of the second and third relative positions relative to the first relative position.

32. The method as defined in claim 23 wherein at least one of said first and second plurality of openings defines an acute angle to one of said first and second outer surfaces after the performance of restoring step (g).

33. The method as defined in claim 23 wherein each of said first and second plurality of openings define an acute angle to one of said first and second outer surfaces after the performance of restoring step (g).

* * * * *